United States Patent
Gruhn et al.

(10) Patent No.: US 9,810,198 B2
(45) Date of Patent: *Nov. 7, 2017

(54) WIND TURBINE ROTOR BLADE COMPONENTS AND METHODS OF MAKING SAME

(71) Applicant: SENVION GMBH, Hamburg (DE)

(72) Inventors: Joel D. Gruhn, Barrington, RI (US);
Ethan Franklin, Morganton, NC (US);
Kameshwaran Narasimhan, Hickory, NC (US)

(73) Assignee: SENVION GMBH, Osterrönfeld (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/196,080

(22) Filed: Jun. 29, 2016

(65) Prior Publication Data
US 2016/0333850 A1 Nov. 17, 2016

Related U.S. Application Data

(66) Substitute for application No. 14/530,071, filed on Oct. 31, 2014, now Pat. No. 9,394,882, which is a
(Continued)

(51) Int. Cl.
*F04D 29/38* (2006.01)
*F03D 1/06* (2006.01)
(Continued)

(52) U.S. Cl.
CPC ............ *F03D 1/0675* (2013.01); *B29B 11/16* (2013.01); *B29C 70/023* (2013.01);
(Continued)

(58) Field of Classification Search
CPC .......... F03D 1/0675; F03D 80/00; F03D 9/25; B29C 70/023; B29C 70/083;
(Continued)

(56) References Cited

U.S. PATENT DOCUMENTS

| 5,961,288 A * | 10/1999 | Rene Legendre .... B29C 70/083 |
| | | 416/134 A |
| 8,876,483 B2 * | 11/2014 | Gruhn ..................... B29B 11/16 |
| | | 416/230 |

(Continued)

FOREIGN PATENT DOCUMENTS

WO WO 2009077582 A1 * 6/2009 ........... B29C 70/382

*Primary Examiner* — Woody Lee, Jr.
*Assistant Examiner* — Joshua R Beebe
(74) *Attorney, Agent, or Firm* — Isus Intellectual Property PLL

(57) ABSTRACT

Structural preform layers of multiple rigid unidirectional strength elements or rods are constructed and arranged for use in fabricating load-bearing support structures and reinforcements of wind turbine blades. Individual preform layers include multiple elongate unidirectional strength elements or rods arranged in a single layer along a longitudinal axis of the preform layer. Each preform layer includes one or more fibrous carrier layers to which the multiple strength elements or rods are joined and arranged in the single layer. Each strength element or rod is longitudinally oriented and adjacent to other elements or rods. Individual strength elements or rods include a mass of substantially straight unidirectional structural fibers embedded within a matrix resin such that the elements or rods have a substantially uniform distribution of fibers and high degree of fiber collimation. The relative straightness of the fibers and fiber collimation provide strength elements or rods and the preform layers with high rigidity and significant compression strength.

19 Claims, 22 Drawing Sheets

Related U.S. Application Data continuation of application No. 14/032,424, filed on Sep. 20, 2013, now Pat. No. 8,876,483, which is a continuation of application No. 13/585,339, filed on Aug. 14, 2012, now Pat. No. 8,540,491, which is a continuation of application No. 13/007,111, filed on Jan. 14, 2011, now abandoned.

(60) Provisional application No. 61/295,006, filed on Jan. 14, 2010.

(51) Int. Cl.
*B29B 11/16* (2006.01)
*B29C 70/02* (2006.01)
*B29C 70/08* (2006.01)
*B29D 99/00* (2010.01)
*F03D 80/00* (2016.01)
*F03D 9/25* (2016.01)
*B29L 31/08* (2006.01)

(52) U.S. Cl.
CPC ........ *B29C 70/083* (2013.01); *B29D 99/0028* (2013.01); *F03D 9/25* (2016.05); *F03D 80/00* (2016.05); *B29L 2031/085* (2013.01); *F05B 2220/30* (2013.01); *F05B 2230/20* (2013.01); *F05B 2240/2211* (2013.01); *F05B 2280/6003* (2013.01); *Y02E 10/721* (2013.01); *Y02E 10/722* (2013.01); *Y02E 10/74* (2013.01); *Y02P 70/523* (2015.11); *Y10T 156/10* (2015.01)

(58) Field of Classification Search
CPC ..... B29D 99/0028; B29B 11/16; Y02E 10/74; Y02E 10/721; B29L 2031/085; Y02P 70/523; F05B 2220/30; F05B 2230/20; F05B 2240/2211; F05B 2280/6003; Y10T 156/10

See application file for complete search history.

(56) References Cited

U.S. PATENT DOCUMENTS

| 9,429,140 | B2 * | 8/2016 | Gruhn | B29B 11/16 |
| 2007/0140861 | A1 * | 6/2007 | Wobben | B29C 70/86 |
| | | | | 416/230 |
| 2012/0308394 | A1 * | 12/2012 | Gruhn | B29B 11/16 |
| | | | | 416/226 |

* cited by examiner

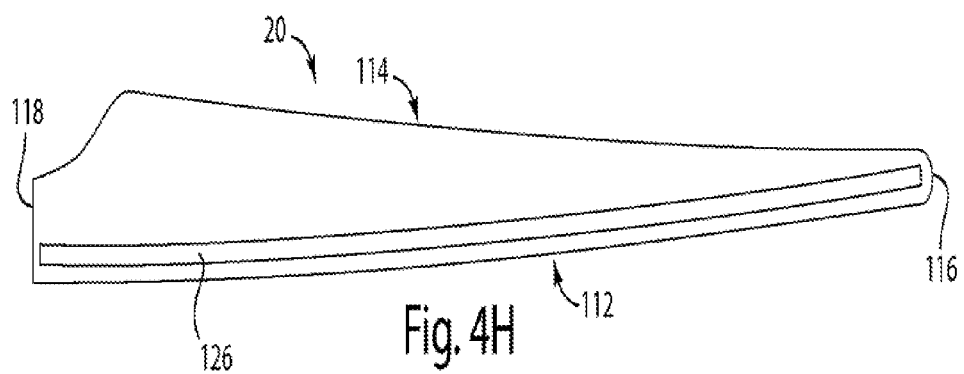
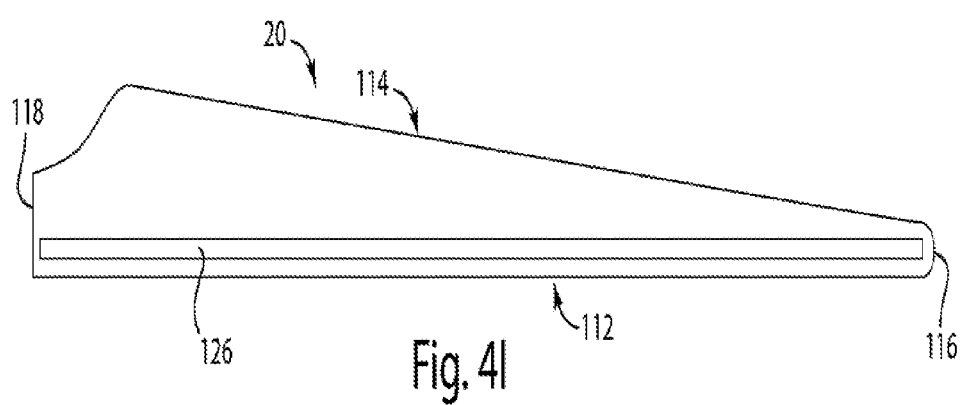
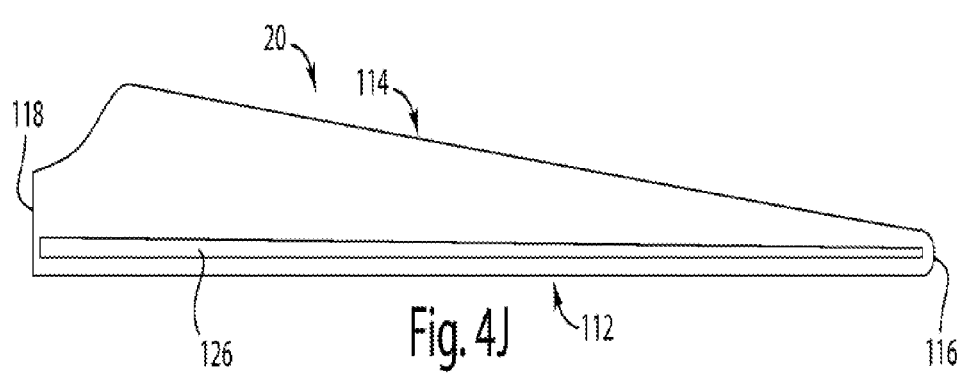

WIND TURBINE ROTOR BLADE COMPONENTS AND METHODS OF MAKING SAME

RELATED APPLICATIONS

This application is a continuation of U.S. application Ser. No. 14/530,071, filed Oct. 31, 2014, which is a continuation of U.S. application Ser. No. 14/032,424, filed Sep. 20, 2013, now U.S. Pat. No. 8,876,483, issued on Nov. 4, 2014, which is a continuation of U.S. application Ser. No. 13/585,339, filed on Aug. 14, 2012, now U.S. Pat. No. 8,540,491, issued on Sep. 24, 2013, which is a continuation of application Ser. No. 13/007,111, filed Jan. 14, 2011, now abandoned, which claims priority to U.S. Provisional Patent Application No. 61/295,006, filed Jan. 14, 2010, the contents of each are incorporated by reference herein in their entirety.

FIELD OF THE INVENTION

The invention relates generally to wind turbine rotor blades. The invention also relates to structural preform layers of multiple rigid strength elements or rods for use in fabricating wind blade components.

BACKGROUND

Technological advances in wind turbines continue to demonstrate that energy from wind power offers a commercially viable alternative energy source. Improvements in design have allowed increases in the sizes of wind turbines and rotor blades such that increases in energy output have been realized. However, manufacturing costs present challenges to the development of wind energy technology as a competitive alternative energy source. In particular, factors that contribute to manufacturing costs and energy efficiencies of wind turbines include the design and construction of rotor blades.

Increases in rotor blade size have demonstrated increases in energy production. Large commercial wind turbines often include rotor blades with spans of 40 to 45 meters or greater. Energy extracted from wind turbines depends on the area of the circle of the rotor blade sweep or rotor diameter from blade tip to blade tip. In particular, increases in blade length increase the area of the circle of the blade sweep that can result in capturing more wind power and increasing energy output. For instance, the area of the circle of the blade sweep is proportional to the square of the blade length, such that, a 10% increase in rotor blade length can result in an increase of 20% in a wind turbine's energy output.

However, scaling up rotor blade size and, in particular, blade length results in a corresponding increase in blade weight and thickness, as well as an increase in the blade's strength requirements. Blade weight is a key limiting factor in blade design whereby an increase in the blade size causes the blade weight to increase faster than the corresponding increase in turbine energy output. In particular, increases in blade length can result in exponential increases in blade weight by a factor of 2.5 to 3 due to increases in blade mass and area. Consequent manufacturing costs would be proportional to the increased amounts of materials consumed in fabricating larger blades and, therefore, can become disproportionally high relative to realized increases in energy output, causing diminishing returns on investments in larger blade sizes. Technological improvements have helped to mitigate increases in blade weight resulting from increases in blade size. However, blade weight remains a limiting factor with respect to improving turbine energy output and efficiency. Thus, increasing turbine energy production through blade size and specifically through blade length presents the challenges of balancing blade length, weight, strength and manufacturing costs to produce blades that cost-effectively increase energy output.

Aerodynamic performance and efficiencies of rotor blades are also critical to efficient and cost-effective wind energy production. Optimum performance of rotor blades is essentially a compromise in blade design between blade shape and blade strength. An ideal blade defines along its span a relatively narrow and twisted shape to enable effective aerodynamic performance, while being relatively thick near or at the blade root to provide the blade with sufficient strength to withstand aerodynamic loads. Blade designs are typically more bulbous near the blade root to provide a thickness and strength that compensates for the relatively narrow and lightweight span of the blade.

Prior art rotor blades include twist bend coupled or twist-coupled blades having a structure that passively affects aerodynamic loads during operation of a wind turbine. Blade design and construction dictate aerodynamic performance and, in particular, the elastic or bending properties that blades exhibit when subjected to aerodynamic loads and pressure. Specifically, such desirable mechanical properties may be built into blade structures through blade shape or curvature and blade fabrication materials. In general terms, a twist-coupled blade bends and twists in response to aerodynamic loads to adjust passively its pitch angle along its length. The pitch angle adjusts the wind load acting on the blade. Passive pitching slightly, e.g., by few or several degrees, towards a feathered position enables the blade to passively distribute and shed wind loads during operation. Blade design and fabrication materials and construction techniques can facilitate the extent of coupling of the blade's bending moment with its twist rotation and thereby the level of passive pitch control the blade may achieve. High levels of coupling blade bending moment and twist demonstrate reductions in aerodynamic loads, particularly under extreme wind conditions, as well as reductions in fatigue loads throughout the rotor or the wind turbine. In addition, twist bend coupling enables blades to adjust constantly and quickly to wind gusts and rotational effects. As a result, increases in energy output and decreases in fatigue damage of the rotor and wind turbine are possible.

Passive pitching results from, in part, the elastic deformation and twist bend coupling in the structural laminates, composites, or other materials constructing the blade and, in particular, constructing the load-bearing structures of the blade. Such materials serve as passive structural components that affect the dynamic response of the blade and aerodynamic loads acting on the blade. Studies of blade designs suggest that overall load reduction can depend on, among other factors, the amount of coupling of structural materials and their design and manufacturing. In addition, structural materials and their design can affect blade cost, stiffness, weight, and strength, as well as blade fatigue and operational life.

Prior art composite fabrication processes often limit the stiffness, strength and fatigue life of structural blade components, such as I-beams, spar caps, and shear webs, to less than ideal or maximum levels. The available forms of reinforcing fibers limit improvements in these processes. For example, glass fiber is commonly supplied as a dry or unfilled fabric, a roving, or a pre-impregnated fabric. In each case the supplied material is wound onto a spool or roll to facilitate handling and shipping. However, winding a layer of fibrous material of finite thickness onto a roll induces fiber waviness or lack of total fiber collimation in the final part, which may not be removable and which has been shown to reduce compressive strength. A reduction in compressive strength must then be compensated with more material, which fabricates an undesirably larger, heavier, and more costly component.

A heavier component may also require more labor. Fabricating such structural components as, for example, a spar cap with fibrous or fiber, e.g., glass, composites, meshes, fabrics, layers, and other materials, often requires relatively large volumes of such materials to build up a structural component. Due to the nature and design of such fibrous and fiber composites, meshes, fabrics, layers, and materials, spar cap manufacturing can be labor-intensive. For instance, fabricating spar caps, such as in a mold, often requires more than 50 glass fabric layers in order to produce a spar cap that may be on the order of 30 to 50 meters or more in length and may have a thickness, at some points along its length, of about 40 mm or more. Clearly, a lower material efficiency requires that a greater quantity of fabric must be used to make a thicker spar cap, and more labor is required to fill the spar cap mold.

In addition, employing such fiber-reinforced fabric layers and composite materials typically requires application of an appropriate resin to bond fabric layers and composite materials and thereby define the finished spar cap geometry. Current methods and techniques of applying bonding resin include resin infusion and resin injection. Such methods and techniques involve infusing under vacuum or injecting under pressure a volume of bonding resin into, for instance, a stack of reinforcing fiber fabric layers and subsequently curing the resin to bond the layers. Because of the lack of structural shape inherent in a fiber fabric, such prior art materials are susceptible to fiber wash during resin infusion or injection that results in undesirable wrinkles, buckling, misplacement, and misorientation of fabric layers and composites in the resulting spar cap.

Further, prior art fiber-reinforced fabric layers and composite materials are susceptible to shrinkage during curing of bonding resin. During resin cure, bonding resin may shrink substantially such that resin shrinkage may cause undesirable wrinkling, kinking, and buckling of fabric layers and composite materials during fabrication of structural components.

Again, the forms of the prior art materials do not support a tightly controlled fabricating or molding process, in turn requiring additional material usage. Consequently, fabrication techniques and processes using fiber-reinforced or fibrous materials can affect the overall manufacturing time and cost of turbine blade production.

Thus, it is desirable to form load bearing and structural components of turbine rotor blades using improved fabrication materials and techniques that accommodate increases in rotor blade size, while decreasing blade weight and increasing blade strength. In addition, it is desirable to employ fabrication materials and techniques to produce such load-bearing structures as spar caps to improve rotor blade aerodynamics and, in cases of swept-shaped rotor blades, to contour such structures to conform to blade curvature or sweep. It is also desirable to use fabrication materials and techniques that help to avoid or to minimize fiber wash and wrinkling, while increasing the fiber volume fraction to ensure sufficient strength in such structural components as spar caps. It is also desirable to use fabrication materials and techniques that increase the overall efficiencies of blade manufacturing.

Further, it is desirable to use fabrication materials and techniques that reduce the manufacturing costs and time associated with producing blade components in terms of reducing materials and labor costs, increasing resin infusion/injection rates, and lowering resin cure times.

SUMMARY

In general, in one aspect, the invention provides a spar cap for a wind turbine blade comprising a composite beam configured as a structural support component of a shell of a wind blade airfoil. The composite beam defines dimensions such that the spar cap extends along at least a portion of the span of the blade. The composite beam can include one or more preform layers with each preform layer including multiple rigid unidirectional strength elements or rods arranged adjacent one another and longitudinally relative to their length in a single layer along a longitudinal axis of the preform layer. The strength elements or rods can be retained in the single layer with a retaining structure interfacing with the elements or rods. One configuration of a retaining structure can include one or more fibrous carrier layers to which the strength elements or rods are joined. The single layer arrangement of the strength elements or rods can define the preform layer as a prefabricated structural element or component. Each strength element or rod can comprise a composite material of elongate and substantially straight structural fibers saturated by a matrix resin. The matrix resin can be distributed with a mass of the fibers, which are oriented longitudinally and are aligned substantially linearly. When cured or solidified, the composite material can form a rigid prefabricated element or rod having a substantially uniform distribution of fibers and high degree of fiber collimation. The straightness of the fibers and significant fiber collimation can yield strength elements or rods with high rigidity and significant compression strength. Such properties are highly advantageous and are required where the preform layers are used in load-bearing structures, such as a composite beam of a spar cap, and in blade reinforcements and other blade components. The rigidity and compression strength of the preform layers according to the invention can provide the spar cap and other blade components, and ultimately the turbine blade, with the mechanical properties required for larger and longer blades without increasing significantly blade weight and materials and manufacturing costs.

Each preform layer can be layered or stacked with one or more other preform layers to form blade structures and components. In one configuration, multiple layered or stacked preform layers can define wholly or partially a length and a thickness of a composite beam of the spar cap. Some configurations of the composite beam can be constructed and arranged with multiple preform layers to define the spar cap with a substantially uniform transverse width and thickness. Other configurations of the composite beam can be constructed and arranged with multiple preform layers to define the spar cap with a transverse width tapering, for instance, toward the tip of the blade. Further configurations of the composite beam can be constructed and arranged with multiple preform layers to define the spar cap with a tapered thickness that tapers along the span of the spar cap toward the tip of the blade and, optionally, toward the root of the blade. Still other configurations of the composite beam can be constructed and arranged with multiple preform layers to define the spar cap with a sweep contour. The sweep contour can correspond to the contour of a swept blade design in which the spar cap is incorporated.

Implementations of the spar cap may include one or more of the following features. The configurations of the spar cap composite beam constructed and arranged with multiple preform layers can include one or more preform layers joined or bonded to, or interleaved with, other preform layers and/or multiple fibrous layers to define the composite beam with the required or desired transverse width and thickness. The composite beam can comprise multiple preform layers that define a certain percentage of the total weight per unit area of the composite beam, such that, the preform layers may comprise any percentage of the total weight of a given area of the composite beam. This percentage may depend on the blade design and shape, the requisite mechanical properties and/or the performance requirements of the blade. For those configurations of the composite beam constructed primarily of multiple layered or stacked preform layers, the preform layers can include up to about 100% of the total weight of the composite beam. In other configurations of the composite beam constructed and arranged with multiple preform layers joined or bonded to, or interleaved with, multiple fibrous layers, the preform layers can include a relatively low percentage of the total weight per unit area of the composite beam. The construction and arrangement of the preform layers according to the invention can provide flexibility in this regard, such that, the preform layers can facilitate forming the composite beam with any number of preform layers, alone or in combination with multiple fibrous layers, to satisfy any required or desired percentage of the total weight of the composite beam.

Further the construction and arrangement of the preform layers according to the invention can provide opportunities to increase or maximize the packing density of the preform layers and thereby the strength elements and rods in the composite beam, such that, the preform layers can increase or maximize the fiber volume fraction of the composite beam. The structural fibers of the strength elements or rods can increase the net total fiber volume fraction of the preform layers. In this manner, the preform layers according to the invention can be employed to manipulate the net total fiber volume fraction of the preform layer and the composite beam of the spar cap without compromising the spar cap in terms of weight and overall dimensions.

The multiple fibrous layers to which one or more preform layers are joined to or interleaved with may include layers of fibers, meshes or fabrics constructed of glass fibers, carbon fibers, graphite fibers, basalt fibers or ceramic fibers, and combinations thereof. Where the composite beam is constructed primarily of multiple preform layers, the preform layers can define varying lengths so that, when the preform layers are stacked or layered with one another to fabricate the composite beam, the varying lengths of the preform layers can define a tapered thickness of the composite beam. Where the composite beam is constructed primarily of multiple fibrous layers, each preform layer can define certain overall dimensions so that, when the preform layers are stacked or layered with one another and/or with multiple fibrous layers to form the composite beam, the preform layers can serve as structural reinforcements or strength members of the spar cap and other portions of the blade.

Multiple stacked or layered preform layers joined to or interleaved with multiple fibrous layers or not, can define a stacked formation to which a bonding resin can be applied to ultimately form the composite beam. The bonding resin can be applied to the stacked formation by various techniques including, but not limited to, resin infusion processes, resin transfer molding, other vacuum techniques, and hand lay-up techniques. After the bonding resin cures or solidifies, the composite beam can define the spar cap with a finished structure having well-defined overall dimensions with minimal irregularities.

In another aspect, the invention provides the preform layer as described above. The preform layer can include multiple unidirectional strength elements or rods arranged adjacent one another and longitudinally relative to their length in a single layer. In some configurations of the preform layer according to the invention, the strength elements or rods are also substantially parallel to one another. The preform layer can further include a retaining structure to hold the multiple strength elements or rods in the single layer. The retaining structure in some configurations of the preform layer can include one or more fibrous carrier layers to which the multiple strength elements or rods are joined. The fibrous carrier layer can include a nonwoven fabric constructed of multiple fibers, yarns, and/or rovings. The fibrous carrier layer can have the same length and transverse width as the preform layer. In other configurations, the fibrous carrier layer can have a wider transverse width than the preform layer to define at least one peripheral border or selvedge that extends outwardly from at least one edge of the preform layer. The border or selvedge can define a sufficient transverse width to serve as an attachment point at which the preform layer may be stacked, layered or interleaved with one or more other preform layers, multiple fibrous layers, and/or borders or selvedges of other preform carrier layers. In this manner, the one or more carrier layers with a border and selvedge can permit the preform layer(s) to connect or join to one or more other components of the composite beam of the spar cap. In addition, the one or more carrier layers with a border or selvedge can permit the preform layer(s) to connect or join the composite beam of the spar cap to adjacent components of the blade, such as a web shear or shell portion of the blade airfoil. The one or more carrier layers with a border and selvedge can also permit the preform layer(s) to connect or join to layers or components of the shell portions of a blade airfoil.

In one configuration, the nonwoven fibrous carrier layer, when assembled with one or more preform layers, can include transverse fibers, yarns and/or rovings arranged in a transverse orientation, or at about 90°, relative to the unidirectional strength elements or rods of the preform layer. The fibrous carrier layer can impart strength to the preform layer and can increase the fiber volume fraction of the preform layer. The fibrous carrier layer can also include a stitched nonwoven fabric, including a biaxial or triaxial fabric. The multiple strength elements or rods can be bonded or adhered to one or both surfaces of the fibrous carrier layer. In other configurations of the preform layer according to the invention, the fibrous carrier layer can include a woven fabric.

In another aspect, the invention provides a multi-layered structural or reinforcement component including at least one preform layer joined to or interleaved with multiple fibrous layers. The multi-layered component can include one or more preform layers stacked, joined to or interleaved with multiple fibrous layers to define the layers of the component. The fibrous layers can include fibrous layers, meshes or fabrics constructed of glass, carbon, graphite, basalt, or ceramic fibers, yarns, and/or rovings, and combinations thereof. The composition and the arrangement of the preform layers and fibrous layers to form the multi-layered component can be determined relative to the purpose and the location of the component in a wind turbine blade. For instance, one configuration of the multi-layered component can include multiple fibrous layers disposed between two preform layers with the strength elements or rods of the preform layers defining an outward surface or exoskeleton of the multi-layered component.

In a further aspect, the invention provides multiple preform layers configured in a continuous web. The continuous web can include multiple preform layers attached adjacent one another along their transverse width. The web can include tapered end zones extending transversely along its width to define each preform layer with a certain length. The tapered end zones are disposed and configured in the web to separate individual preform layers from one another. In addition, the tapered end zones can be further configured to permit preform layers to be separated, such as by cutting, from one another and from the web. In this manner, multiple preform layers required to fabricate one or more composite beams, or one or more components of the turbine blade, can be provided in the continuous web form for purposes of storing and shipping and for dispensing multiple preform layers during fabrication of a composite beam or other blade components.

Features and advantages of the aspects of the invention, along with the invention itself, will be more fully understood after a review of the following figures, detailed description, and claims.

BRIEF DESCRIPTION OF THE DRAWINGS

FIG. 4H is a leading edge view of a blade including a spar cap according to the invention defining a sweep;

FIG. 4I is a leading edge view of a blade including a spar cap according to the invention defining a relatively straight construction along its length;

FIG. 4J is a leading edge view of a blade including a spar cap according to the invention defining a tapering transverse width;

DETAILED DESCRIPTION

Figure 1:
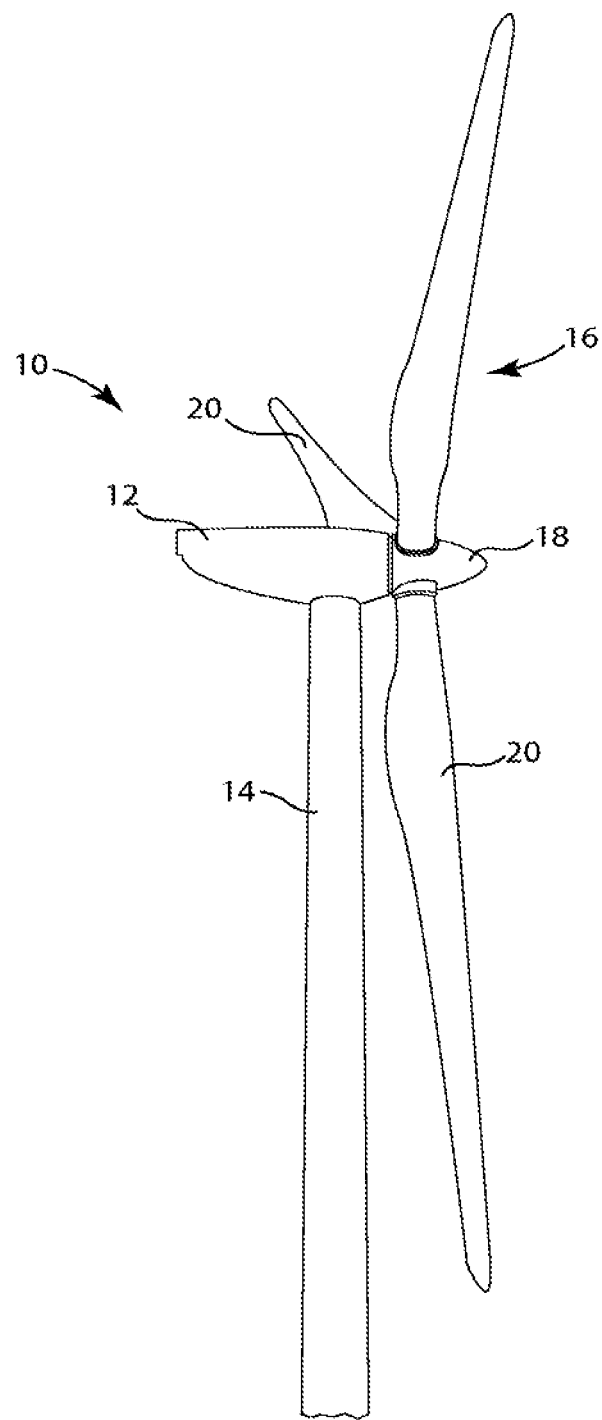
FIG. 1 is a perspective view of a wind turbine.
Figure 2:
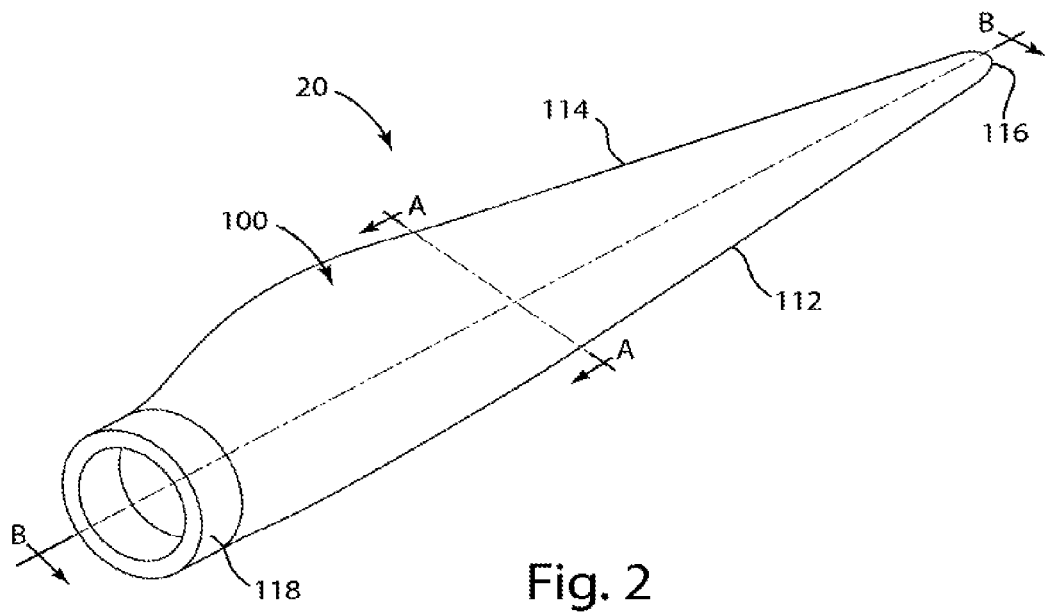
FIG. 2 is a perspective view of a wind turbine blade.

Referring to FIGS. 1 and 2, in one aspect, the invention provides a wind turbine 10 including a nacelle 12 mounted to a tower 14 and a rotor 16 including a rotating hub 18 and turbine blades 20. The rotor 16 is operatively connected to an electrical generator (not shown) housed in the nacelle 12. The tower 14 exposes the blades 20 to the wind. The blades 16 capture wind energy and transform wind energy into a rotational motion, which the electrical generator converts into electrical energy by the electrical generator. The wind turbine 10 illustrated in FIG. 1 includes three turbine blades 20, although the invention is not specifically limited to three blades 20 and anticipates that the rotor 16 can include more or fewer turbine blades.

As shown in FIG. 2, the turbine blade 20 includes an airfoil portion 100 extending between a tip 116 and a root 118 of the blade. The airfoil portion 100 defines a leading edge 112 and a trailing edge 114 of the blade 20. The root 118 is constructed and arranged for connection to the rotating hub 18 of the wind turbine 10. The longitudinal or lengthwise distance between the root 118 and the tip 116 of the blade is referred to as the span or length $L_1$ of the blade 20.

Figure 3:
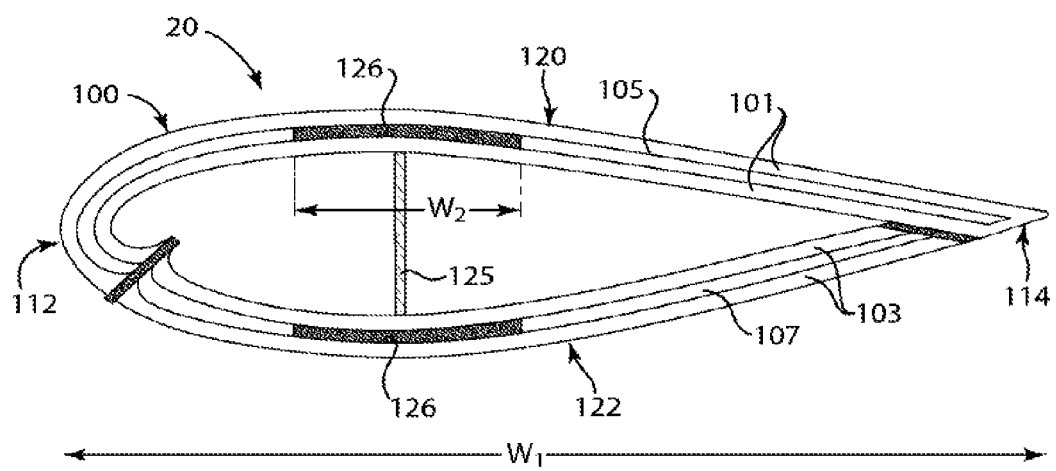
FIG. 3 is a cross-sectional view of the blade shown in FIG. 2 taken at lines A-A illustrating a portion of the chord of the blade.

Referring to FIG. 3, a cross-sectional view of the blade 20 shown in FIG. 2 taken along lines A-A is illustrated. The airfoil portion 100 includes one or more layers 101 and 103 shaped to define the airfoil portion 100 with the leading edge 112 and the trailing edge 114. The distance between the leading edge 112 and the trailing edge 114 is referred to as the chord or width $W_1$ of the blade 20. The chord $W_1$ varies along the length of the blade 20. The airfoil portion 100 includes a first or upper shell portion 120 and a second or lower shell portion 122 as shown in FIG. 3. The first shell portion 120 and the second shell portion 122 are adhered together along the perimeters of the shell portions 120 and 122 and at adhesive joints (not shown) adjacent to the leading edge 112 and the trailing edge 114.

With further reference to FIG. 3, the first and the second shell portions 120 and 122 may include one or more reinforcing layers 101 and 103 configured with fiber-reinforced materials including, for instance, fiber reinforced composites and/or fabrics. In addition, the shell portions 120 and 122 may include a stiffening core 105 and 107 disposed between one or more of the reinforcing layers 101 and 103 and formed of, for instance, balsa wood or foam.

The blade 20 also includes a longitudinal load bearing structure or spar cap 126 incorporated with one or more of the layers of the shell portions 120 and 122 and extending along at least a portion of the span or length $L_1$ of the blade 20. One or more shear webs 125 extending transversely between the spar caps 126 and the shell portions 120 and 122 join the spar caps 126. The spar caps 126 and the shear webs 125 are reinforcement structures and are constructed and arranged to provide rigidity, strength, and stability to the blade 20. These blade 20 properties help to support the blade weight and help to substantially reduce or eliminate damage to the blade 20 from blade flexure and from aerodynamic loads acting on the blade 20, as well as help to substantially reduce or eliminate the risk of contact of the blade 20 with the turbine tower 14.

Spar Cap Formation and Configurations

Referring to FIGS. 4A-4E, and with further reference to FIG. 3, in another aspect, the invention provides a blade spar cap 126 constructed and arranged as a composite beam 127. As illustrated in FIG. 3, the spar cap 126 may be joined or bonded to one or more layers forming the first or upper shell portion 120, and a second spar cap 126 may be joined or bonded to one or more layers forming the second or lower shell portion 122. In one configuration of the spar cap 126 according to the invention, the spar cap 126 is constructed and arranged for joining to or for incorporation with at least the intermediate layer 105 and 107 of a shell portion 120 and 122. The invention is not limited in this respect and envisions that the spar cap 126 may be constructed and arranged in various configurations and joined to or incorporated with the blade shell portions 120 and 122 in any manner to form a load-bearing structure of the shell portions 120 and 122.

Figure 4A:
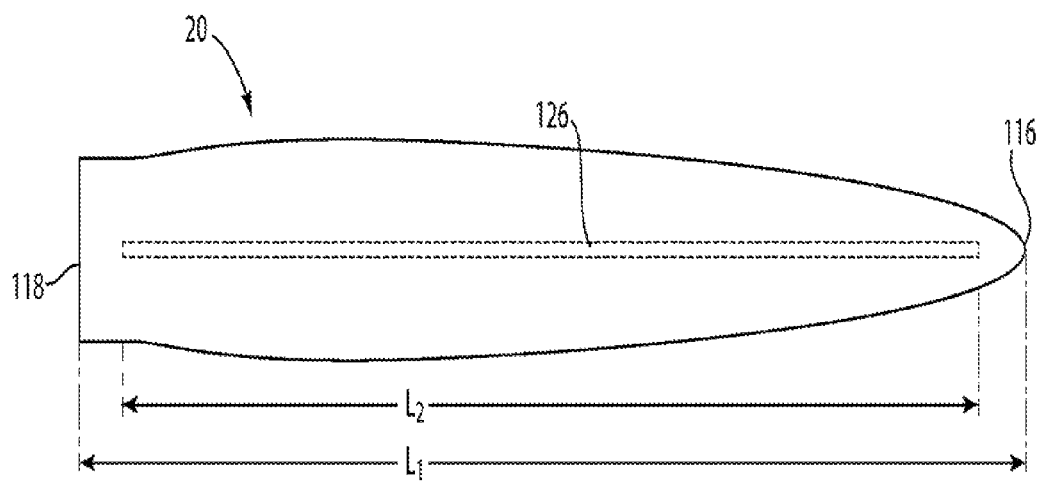
FIG. 4A is a leading edge view of the blade shown in FIGS. 2 and 3 including a spar cap according to one aspect of the invention.
Figure 4B:
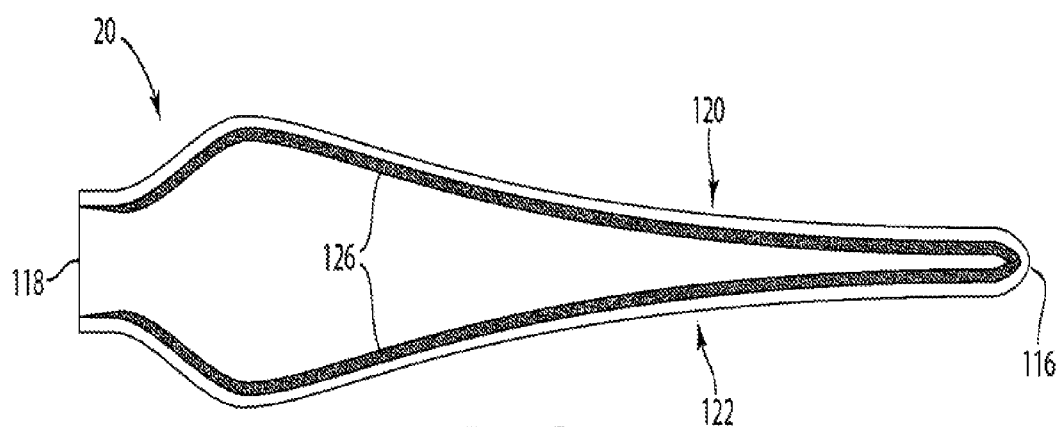
FIG. 4B is a cross-sectional view of the blade shown in FIG. 2 taken at lines B-B illustrating two spar caps according to the invention.

FIG. 4A is a view of the leading edge 112 of the blade 20 including the spar cap 126 according to the invention. FIG. 4B illustrates a cross-sectional view of the blade span $L_1$ taken at lines B-B of FIG. 2 with the spar cap 126 included in the first and the second shell portions 120 and 122. As shown in FIG. 4A, the spar cap 126 is positioned in the turbine blade 20 between the blade root 118 and the blade tip 116 and defines a length $L_2$ that extends along at least a portion of the span $L_1$ of the turbine blade 20. The length $L_2$ of the spar cap 126 is typically greater than its transverse width $W_2$.

Figure 4C:
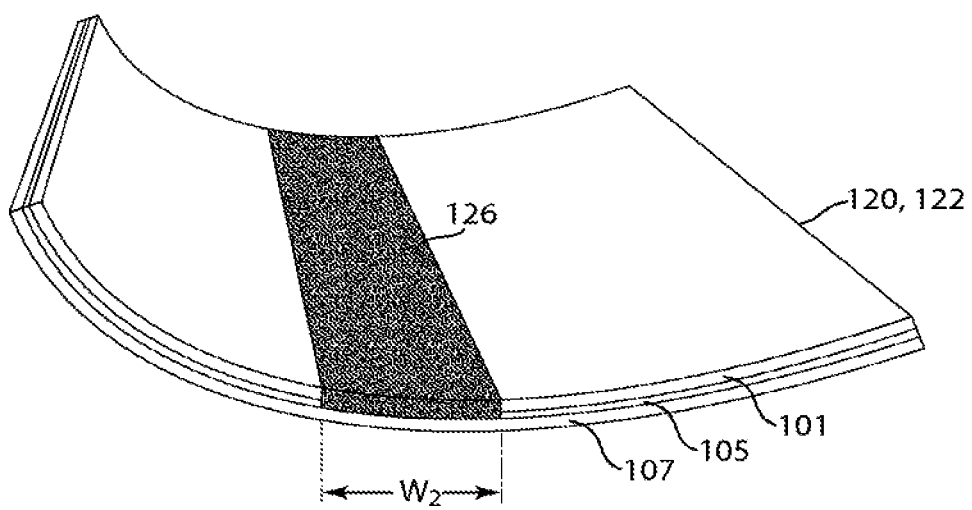
FIG. 4C is a cross-sectional transverse view of a portion of a shell of the blade including one configuration of the spar cap according to the invention.

As shown in FIG. 4C, the spar cap 126 defines a transverse width $W_2$ that is less than the chord $W_1$ of the blade 20. The transverse width $W_2$ may be substantially uniform along the spar cap's length $L_2$ in one configuration of the spar cap 126 according to the invention. As described below, in another configuration of the spar cap 126 according to the invention the transverse width of the spar cap 126 may include a tapering transverse width, tapering or narrowing along the spar cap's length $L_2$, towards the blade tip 116.

Spar caps, such as those illustrated in FIG. 3 and in FIGS. 4A and 4B, are often fabricated or manufactured in a mold (not shown) configured as a horizontal pan having an interior defined by a bottom panel and two sidewalls that extend upward from the bottom panel and define an upper opening of the mold. The bottom and sidewalls have dimensions that help to fabricate the spar cap 126 with the required or desired length $L_2$ and the required or desired transverse width $W_2$. The height of the sidewalls of the mold frequently corresponds to the required or desired thickness of the spar cap 126. When disposed in a horizontal position with the opening upward, the interior of the mold may receive fabrication materials. In one configuration of the spar cap 126 according to the invention, multiple preform layers 300A and 300B, as described below, may be layered or stacked with one another, or may be layered or stacked vertically within the mold interior, to build the spar cap 126.

Spar caps may also be fabricated or manufactured in an integrated mold (not shown) configured to form at least portions of the spar cap 126 and the shell portions 120 and 122 of the blade 20. Such molds similarly have configurations and dimensions to help to fabricate the spar cap 126 with the required or desired length $L_2$, transverse width $W_2$ and thickness. Such molds may also permit fabrication materials, such as the preform layers 300A and 300B described below, to be layered or stacked with one another, or to be layered or stacked vertically, within the interior of the mold.

Figure 4D:
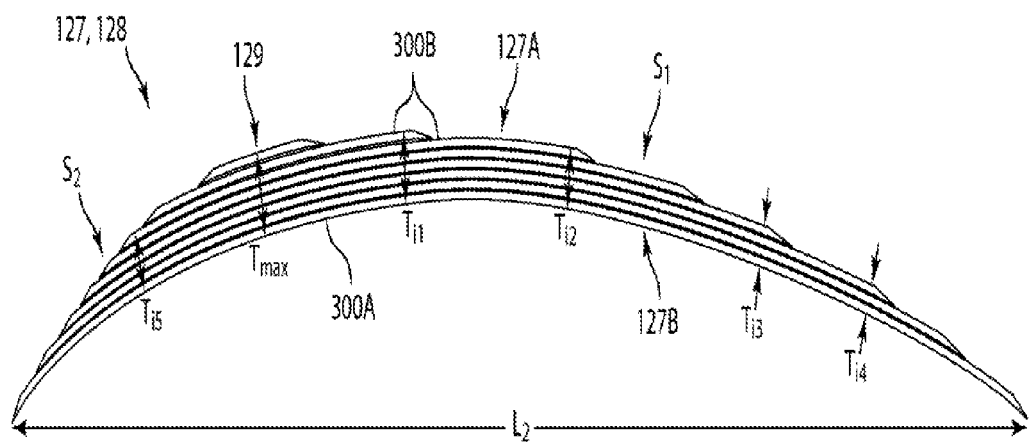
FIG. 4D is a side view of multiple preform layers arranged in a stacked formation to form a composite beam of a spar cap according to the invention.
Figure 4E:
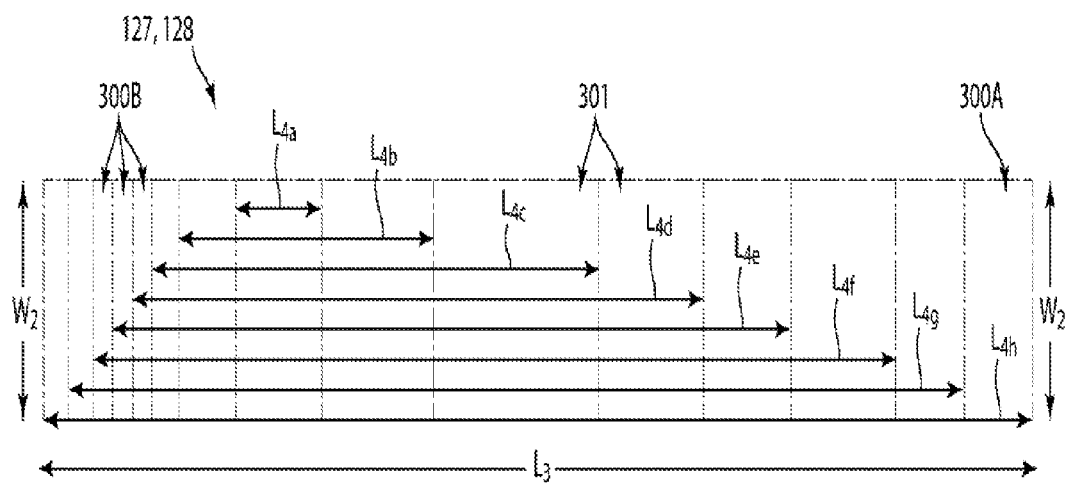
FIG. 4E is a top view of the stacked formation of multiple preform layers shown in FIG. 4D.

FIG. 4D illustrates a side view of the spar cap 126 according to the invention taken along its longitudinal dimension or length $L_2$, and FIG. 4E illustrates a top view of the spar cap 126 shown in FIG. 4D. In the illustrated configuration, the spar cap 126 according to the invention comprises a composite beam 127 including multiple preform layers 300A and 300B of highly flexible strength elements or rods, which are described in detail below. The multiple preform layers 300A and 300B are arranged in a stacked formation 128 and are fixed in the stacked formation 128 with bonding resin to form a composite beam 127. The composite beam 127 extends along at least a portion of the blade span $L_1$ and defines a thickness $T_{i1\text{-}in}$. As shown in FIG. 4D, the thickness $T_{i1\text{-}in}$ of the composite beam 127 varies along its length $L_2$ such that the spar cap 126 defines a tapering thickness $T_{i1\text{-}in}$ along the blade span $L_1$. The thickness of the composite beam 127 may be varied to accommodate structural aspects of the blade 20 design and to provide the blade 20 with load bearing properties. In one configuration of the spar cap 126 according to the invention, the composite beam 127 defines a varying thickness $T_{i1\text{-}in}$ that tapers along its length $L_2$ from an area 129 of greatest thickness $T_{max}$ toward the blade tip 116 and toward the blade root 118. Various stations along the spar cap 126 define certain thicknesses $T_{i1}$, $T_{i2}$, $T_{i3}$, and $T_{i4}$, as illustrated in FIG. 4D; and such thicknesses may vary to help to configure the spar cap 126 and, in at least one configuration of the spar cap

126 according to the invention, to configure the spar cap 126 with a tapering thickness. The invention is not limited in this respect and anticipates that the composite beam 127 of the spar cap 126 may be constructed to define a varying thickness or a substantially uniform thickness along its length $L_2$.

As shown in FIGS. 4D and 4E, multiple preform layers 300A and 300B having varying lengths are stacked with one another as layers, or are stacked vertically as layers within a spar cap mold. Each individual preform layer 300A and 300B may be disposed above or below another preform layer 300A and 300B to build the thickness of the composite beam 127. As shown in FIG. 4E, each preform layer 300A and 300B is stacked at a predetermined position along another adjacent preform layer 300A and 300B to help to define a tapering thickness $T_{i1}$, $T_{i2}$, $T_{i3}$, and $T_{i4}$. Within a spar cap mold, preform layers 300A and 300B may be stacked vertically adjacent one or more other preform layers 300A and 300B to build the spar cap 126. One or more preform layers 300A may have a length $L_3$ that is relatively the longest preform layer of a multiple of preform layers 300A and 300B forming the stacked formation 128 to define one surface 127B of the composite beam 127. As shown in FIG. 4E, other preform layers 300B may have shorter and varying lengths $L_{4a}$, $L_{4b}$, $L_{4c}$, $L_{4d}$, etc. When assembled, the varying lengths $L_3$ and $L_{4a}$, $L_{4b}$, $L_{4c}$, $L_{4d}$, etc. of the preform layers 300A and 300B taper the thickness of the composite beam 127 along its length $L_2$, as shown in FIG. 4D. The configuration of the spar cap 126 according to the invention can thereby be readily adapted or tailored to any blade length, width, and/or thickness contour.

The stacked formation 128 of the multiple preform layers 300A and 300B may include preform layers 300A and 300B stacked such that the side edges 301 of each individual preform layer 300A and 300B are aligned longitudinally, as shown in FIG. 4E. Alternatively, some or all of the preform layers 300A and 300B of the stacked formation 128 are disposed relative to one another, such that, the side edges of the preform layers 300A and 300B are offset (not shown) along the transverse width $W_2$ of the stacked formation. 128. The non-aligned or offset side edges of such preform layers 300A and 300B help to create increased surface area of the spar cap 126, which may help to increase the bond strength along the side edges of the spar cap 126 and/or may help to prevent formation of seams along the stacked formation 128.

When assembled, the stacked preform layers 300A and 300B may further help to configure a surface of the composite beam 127 according to the invention as a tapered or stepped surface 127A, which results from the varying lengths $L_3$ and $L_{4a}$, $L_{4b}$, $L_{4c}$, $L_{4d}$, etc. of the preform layers 300A and 300B. A non-tapered or non-stepped surface 127B may also result from one or more preform layers 300A having longer or the longest length $L_3$ of the multiple preform layers of the spar cap 126. In one configuration of the spar cap 126 according to the invention, the tapered or stepped surface 127A is oriented outwardly toward an outer surface of the blade airfoil 100, while the non-tapered or non-stepped surface 127B is oriented inwardly toward a hollow interior of the blade airfoil 100 defined by an internal configuration of the airfoil 100. Alternatively, in another configuration of the spar cap 126 according to the invention, the tapered or stepped surface 127A is oriented inwardly away from the outer surface of the blade airfoil 100 and toward the hollow interior of the blade airfoil 100.

As described, spar caps may define a tapering thickness $T_{i1}$, $T_{i2}$, $T_{i3}$, $T_{i4}$, $T_{in}$ along their length $L_2$, tapering toward the blade tip 116 and tapering toward the blade root 118 from a point of greatest or maximum thickness $T_{max}$ of the spar cap. As shown in FIG. 4D, the tapered or stepped beam surface 127A has a certain rate of taper $S_1$ and $S_2$ that corresponds to the required or desired thickness of the composite beam 127. The rate of taper $S_1$ and $S_2$ corresponds to changes in the thickness of the beam 127 and to a given ratio of the change in beam thickness per unit of beam length $L_2$. A small rate of taper $S_1$ represents gradual tapering of the beam thickness, e.g., $T_{i1}$, $T_{i2}$, and $T_{i3}$, while a large rate of taper $S_2$ represents abrupt or steep tapering of the beam thickness, e.g., $T_{i4}$. As shown in FIG. 4D, the beam surface 127A and thickness $T_{i1}$, $T_{i2}$, and $T_{i4}$ taper at a gradual rate $S_1$ from the area 129 of greatest thickness $T_{max}$ toward the blade tip 116. The gradually decreasing thickness $T_{i1}$, $T_{i2}$, and $T_{i3}$ helps to provide the spar cap 126 with sufficient strength and flexibility as well as decreasing weight along the span $L_1$ of the blade 20. In contrast, the surface 127A and thickness $T_{i4}$ of the beam 127 extending from the blade root 118 increases at a steep taper rate $S_2$. The steep taper rate $S_2$ provides beam thickness and thereby helps to provide strength and support to the portion of the spar cap 126 that joins with or connects to the blade root 118.

In one example, for illustrative purposes only, where the blade 20 defines a length $L_1$ of forty (40) meters, the spar cap 126 defines a length $L_2$ of about thirty nine (39) meters (with a point of greatest thickness $T_{max}$ of about 40 mm disposed at a station of about 3 meters from the blade root 118). The spar cap 126 has a substantially uniform transverse width $W_2$ of about 500 mm, and a gradual rate of taper $S_1$ of the beam's surface 127A may have a ratio of about 1:900. In this configuration, a steep rate of taper $S_2$ may have a ratio of about 1:50. The invention is not limited to any particular rate(s) of taper $S_1$ and $S_2$ or to any particular thickness of the composite beam 127 because these features of the beam are not necessarily constant or limited. The spar cap 126 according to the invention, therefore, may be constructed of any thickness and rate of taper to help to meet the strength and flexibility requirements of a particular spar cap design.

As shown in FIGS. 4D and 4E, and as described above, the tapered formation 128 of the composite beam 127 may result from stacking or otherwise layering multiple preform layers 300A and 300B in a mold to define the tapering thickness and the transverse width $W_2$ of the composite beam 127. As described below with reference to FIGS. 5A-5D and FIG. 6, each preform layer 300A and 300B includes a single layer of a plurality of strength elements or rods 202. Each strength element or rod 202 is disposed within an individual preform layer 300A and 300B adjacent to at least one other strength element or rod 202 along its longitudinal dimension or length. The construction and arrangement of the plurality of longitudinally oriented strength elements or rods 202 of the preform layers 300A and 300B help to provide the composite beam 127 and the spar cap 126 with stiffness, flexibility, and strength.

Figure 4F:
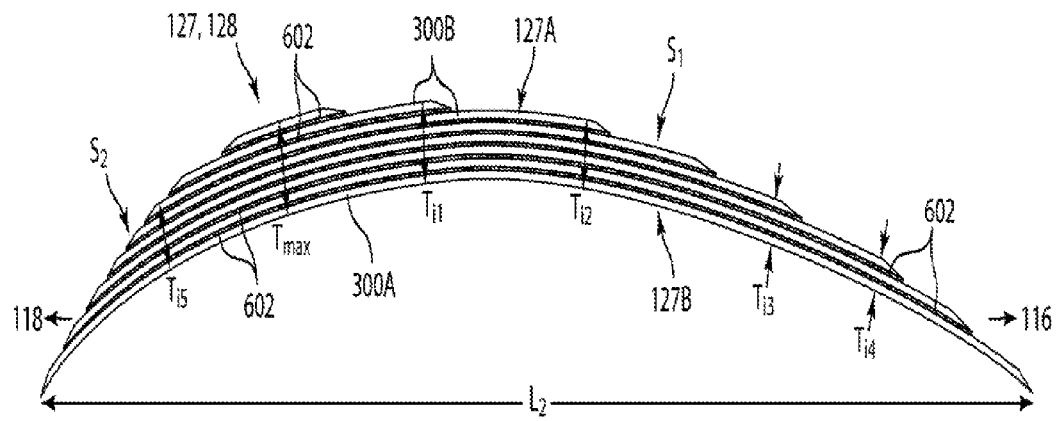
FIG. 4F is a side view of another aspect of the invention providing a composite beam including multiple preform layers arranged with multiple fibrous layers to form a composite beam.

Referring to FIG. 4F, and with further reference to FIGS. 4A-4E, in another aspect, the invention provides the stacked formation 128 or the composite beam 127 comprising multiple preform layers 300A and 300B, as described above and in further detail below, layered with multiple fibrous layers, meshes or fabrics 602. The fibrous layers, meshes or fabrics 602 include, but are not limited to, dry or unfilled fabrics or meshes, pre-impregnated fiber fabrics or meshes, fiber yarns, fiber rovings, and combinations thereof, and are collectively referred to as "fibrous layers" for purposes of disclosing the inventions. The fibers comprising the fibrous layers 602 may include glass fibers, yarns, and/or rovings; carbon fibers, yarns, and/or rovings; graphite fibers, yarns, and/or rovings; basalt fibers, yarns, and/or rovings; ceramic fibers, yarns, and/or rovings; and combinations thereof.

More specifically, the stacked formation 128 or the composite beam 127 according to the invention includes one or more preform layers 300A and 300B stacked, layered or interleaved with one or more fibrous layers 602. As shown in the side view of the stacked formation 128 or the composite beam 127 of FIG. 4F, one or more preform layers 300A and 300B may be stacked or layered with, or disposed above and/or below, one or more fibrous layers 602. The tapering thickness $T_{i1-in}$, the rate(s) of taper $S_1$ and $S_2$, length $L_2$, and the transverse width $W_2$ that are required or desired of the stacked formation 128 and the composite beam 127 are achieved in this configuration according to the invention with stacking, layering or interleaving preform layers 300A and 300B and multiple fibrous layers 602. Where the spar cap 126 is formed using a spar cap mold, or a mold that forms at least a portion of a spar cap and a shell portion 120 or 122 of the blade 20, the preform layers 300A and 300B may be stacked vertically above and/or below one or more fibrous layers 602 and/or one or more preform layers 300A and 300B.

As shown in FIG. 4F, in one configuration of the stacked formation 128 or the composite beam 127 according to the invention, multiple preform layers 300A and 300B having varying lengths are stacked, layered or interleaved with multiple fibrous layers 602 also having varying lengths to help to achieve the tapering thickness $T_{i1-in}$ of the stacked formation 128 or composite beam 127. Each individual preform layer 300A and 300B may be disposed above and/or below another preform layer 300A and 300B or one or more fibrous layers 602 to build the thickness of the stacked formation 128 and the composite beam 127. FIG. 4E illustrates the varying lengths $L_{4a}$, $L_{4b}$, $L_{4c}$, $L_{4d}$, etc. of the preform layers 300A and 300B of a given stacked formation 128 and composite beam 127; however, FIG. 4E may also serve to illustrate the possible varying lengths $L_{4a}$, $L_{4b}$, $L_{4c}$, $L_{4d}$, etc. that multiple fibrous layers 602 may define to help to achieve, along with the multiple preform layers 300A and 300B, the tapering thickness of the stacking formation 128 and composite beam 127. As shown in FIG. 4F, one or more preform layers 300A and 300B are stacked with or adjacent multiple fibrous layers 602, such that, one or more preform layers 300A and 300B is/are disposed at a predetermined position(s) within the stacked formation 128 or composite beam 127 to help to define the thickness of the stacked formation 128 or composite beam 127. At such positions, the one or more preform layers 300A and 300B are stacked along other preform layers 300A and 300B or along one or more fibrous layers 602. Layering preform layers 300A and 300B with multiple fibrous layers 602 thereby may help to define the tapering thickness $T_{i1}$, $T_{i2}$, $T_{i3}$, and $T_{i4}$ and the rate(s) of taper $S_1$ and $S_2$ of the stacked formation 128 or the composite beam 127.

As shown in FIG. 4F, and with further reference to FIG. 4E, one or more preform layers 300A and 300B and/or one or more fibrous layers 602 may have lengths $L_3$ that are relatively long in comparison to other preform layers and fibrous layers 602 to help to define a stepped or tapered surface 127B of the stacked formation 128 and the composite beam 127. Other preform layers 300B and fibrous layers 602 may have in comparison relatively shorter and varying lengths $L_{4a}$, $L_{4b}$, $L_{4c}$, $L_{4d}$, etc. As shown in FIG. 4F, the varying lengths $L_3$ and $L_{4a}$, $L_{4b}$, $L_{4c}$, $L_{4d}$, etc. of the preform layers 300A and 300B and the fibrous layers 602 help to define the tapering thickness of the stacked formation 128 and composite beam thickness along its length $L_2$. As also shown in FIGS. 4E and 4F, one or more fibrous layers 602 having certain defined lengths, e.g., $L_{4c-4d}$, may be layered with one or more preform layers 300A and 300B having defined lengths, e.g., $L_{4a-4b}$ and $L_{4e-4f}$ to help to achieve a requisite tapering thickness $T_{i1-in}$ and rate(s) of taper $S_1$ and $S_2$ of the stacked formation 128 or the composite beam 127. The configuration of the stacked formation 128 and the composite beam 127 according to the invention can thereby be readily adapted and tailored to any blade length, width and/or thickness contour.

The stacked formation 128 and the composite beam 127 may comprise multiple preform layers 300A and 300B that define a certain percentage of the total weight per unit area of the stacked formation 128 or composite beam 127. The invention is not limited in this respect and anticipates that the preform layers 300A and 300B may comprise any percentage of the total weight of a given area of the stacked formation 128 and composite beam 127. This percentage may depend on the blade design and shape, the requisite mechanical properties and/or the performance requirements of the blade. Additionally, or alternatively, any of the configurations of the stacked formation 128 and composite beam 127 shown in FIGS. 4D-4G may include one or more preform layers 300A and 300B configured to reinforce one or more select areas along the stacked formation 128 or composite beam 127. For instance, one or more preform layers 300A and 300B may be configured to partially reinforce one or more select areas of the stacked formation 128 and composite beam 127 shown in FIG. 4F, e.g., in addition to the preform layers 300A and 300B layered with multiple fibrous layers 602 to construct the stacked formation 128 and composite beam 127 as described above. Selective placement of preform layers 300A and 300B within the stacked formation 128 and composite beam 127 may help to reduce aerodynamic loading along the blade 20 during high wind conditions. For instance, one or more preform layers 300A and 300B may be disposed within the stacked formation 128 to define a higher density of preform layers 300A and 300b along one portion of the spar cap 126, such as one or more portions of the spar cap 126 oriented toward the leading edge of the blade shell 120 and 122. The higher quantity of preform layers 300A and 300B would help couple bending of the spar cap and blade with twisting of the spar cap and blade that occur in response to aerodynamics loads along the blade 20 during turbine operation. The higher quantity of preform layers 300A and 300B may thereby help the blade 20 pitch to reduce such aerodynamic loads.

In a further instance, one or more preform layers 300A and 300B may be configured to partially reinforce one or more select areas of the stacked formation 128 and composite beam 127 constructed primarily of multiple fibrous layers 602, such that, the preform layer(s) 300A and 300B may comprise a low percentage of the total weight of certain select areas. In this configuration the one or more preform layers 300A and 300B may constitute any percentage, and as little as 1% or less, of the total weight of a select area of the stacked formation 128 and composite beam 127.

As discussed below in detail with reference to FIGS. 10A-10I, one or more preform layers 300A and 300B can be joined or bonded to, or interleaved with, one or more fibrous layers 602 to form a multi-layered structural component 702 of the spar cap 126 or shell portions 120 and 122 of the blade 20. One or more components 702 may also be constructed as reinforcements for one or more select areas along the composite beam 127 of the spar cap 126. In addition, one or more components 702 may be constructed to layer or stack with the preform layers 300A and 300B and multiple fibrous layers 602 that construct the stacked formation 128 and composite beam 127 shown in FIG. 4F.

Figure 4G:
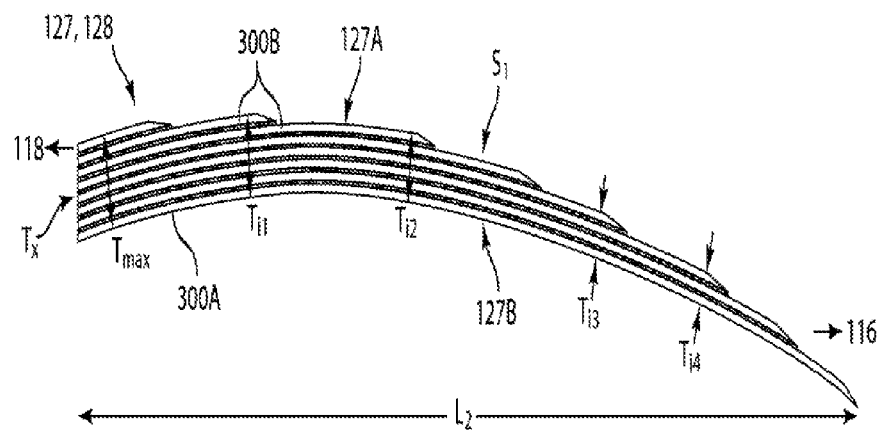
FIG. 4G is a side view of another configuration of the stacked formation shown in FIG. 4D or FIG. 4F.

Referring to FIG. 4G, another configuration of the stacked formation 128 and composite beam 127 according to the invention is illustrated. The preform layers 300A and 300B, alone or in combination with multiple fibrous layers 602, define the spar cap 126 with a thickness that tapers at a certain rate of taper $S_1$ toward the blade tip 116, while a portion of the spar cap 126 oriented toward, or positioned adjacent or near, the blade root 118 defines a substantially uniform thickness. In this configuration, the stacked formation 128 or composite beam 127 tapers along its span $L_1$ only toward the blade tip 116 and provides sufficient thickness along one end to join or connect the spar cap 126 to the blade root 118 or an area of the blade airfoil adjacent the blade root 118.

Referring to FIGS. 4H and 4I, the spar cap 126 according to the invention can be designed and fabricated with the preform layers 300A and 300B, or the preform layers 300A and 300B stacked, layered or interleaved with multiple fibrous layers 602, to serve as structural supports for swept blade designs and straight blade designs. As shown in FIG. 4H, the blade 20 may be configured with a sweep to handle aerodynamic loads and/or to affect bend-twist coupling. In such blade designs, the preform layers 300A and 300B and fibrous layers 602 can help to configure the spar cap 126 with a sweep or swept span in order the spar cap 126 may exhibit similar bend-twist coupling as the swept blade 20 responds to aerodynamic loads. With a swept construction, the preform layers 300A and 300B of the spar cap 126 would help to restrain the fibrous layers 602 along an inner edge of a bend or curvature of the spar cap 126 as it bends and twists in response to aerodynamic loads. Restraining fibrous layers 602 would prevent or minimize wrinkling and buckling of fibrous layers 602. In comparison, FIG. 4I illustrates the spar cap 126 according to the invention with a relatively straight span.

Referring to FIG. 4J, in an alternative configuration of the spar cap 126 according to the invention, the spar cap 126 defines a transverse width $W_2$ less than the chord $W_1$ of the blade 20 and which tapers or narrows along the spar cap length $L_2$ toward the blade tip 116. As in other configurations of the spar cap 126, the length $L_2$ of the spar cap 126 is typically greater than its transverse width $W_2$. As shown in FIG. 4J, the spar cap 126 has a transverse width $W_2$ tapering or narrowing from one end, e.g., configured to join or connect the spar cap 126 to the blade root 118, to an opposite end, e.g., oriented toward to the blade tip 116. In other words, the transverse width $W_2$ of the spar cap 126 tapers or narrows from a given transverse width $W_2$, e.g., closest to the blade root 118, to a second transverse width $W_2$ at an opposite end of the spar cap 126, e.g., closest to the blade tip 116.

As mentioned above, the spar cap 126 according to the invention may be constructed as a pre-cast or pre-molded composite beam 127, e.g., employing a spar cap mold. In this case, the composite beam 127 is constructed as a separate component from the blade airfoil 100 and shell portions 120 and 122 and thereafter assembled with each shell portion 120 or 122 during the formation or molding of the shell portions 120 and 122. Alternatively, the spar cap 126 may be constructed during, and as part of, the formation or molding process constructing the shell portions 120 and 122. In each configuration, the preform layers 300A and 300B, or the preform layers 300A and 300B and fibrous layers 602, constructing the composite beam 127 initially define a stacked formation 128 that may be assembled, e.g., within a spar cap mold, as described herein.

As will be described in detail below with reference to FIGS. 11A and 11B, bonding resin 502 is applied to the stacked formation 128 once the requisite number of preform layers 300A and 300B, or the requisite number of preform layers 300A and 300B and fibrous layers 602, are stacked, layered or interleaved to build the stacked formation 128. Bonding resin 502 is applied according to methods and techniques that facilitate penetration of resin into the stacked formation 128. The resin 502 surrounds individual strength elements or rods 202 and penetrates through and surrounds adjacent or stacked preform layers 300A and 300B and fibrous layers 602, if present, so that resin 502 fills any spaces or voids 500 between individual elements or rods 202, between preform layers 300A and 300B, between fibrous layers 602, and/or between preform layers 300A and 300B and fibrous layers 602. During resin cure, the resin 502 bonds individual strength elements or rods, individual preform layers 300A and 300B, and/or individual fibrous layers 602 with stacked or adjacent preform layers 300A and 300B and/or other fibrous layers 602 to form the composite beam 127.

Any of a variety of methods and techniques of applying bonding resin 502 to the stacked formation 128 may be employed including methods and techniques using pressure, heat, or vacuum that infuses or injects bonding resin into the stacked formation 128. Resin infusion techniques may include applying a vacuum to the stacked formation 128 that draws bonding resin 502 into and through the preform layers 300A and 300B and fibrous layers 602. For instance, where the stacked formation 128 is constructed within a mold, a vacuum may be applied along the circumference of the mold. The vacuum draws the resin supply into the mold along the transverse width of the mold, and further draws the resin supply through the stacked formation 128 along its transverse width $W_2$. Such resin infusion methods include, but are not limited to, Seeman Composite Resin Infusion Molding Process (SCRIMP), vacuum-assisted resin transfer molding (VARTM), other vacuum techniques, and hand lay-up techniques.

Other techniques include resin injection by which the supply of bonding resin 502 is delivered to a closed mold under pressure and is injected into the mold, and thereby into and through the stacked formation 128, to fill any spaces or voids in the stacked formation 128.

After application of the requisite volume of bonding resin 502, the resin-filled stacked formation 128 is subjected to a cure process, such as, for example, a process employing heat at any suitable temperatures for any suitable times sufficient to cure adequately the bonding resin 502 and to bond the preform layers 300A and 300B, individual strength elements or rods, and fibrous layers 602 together. Alternatively, where resin infusion techniques are employed, infusion and curing stages may overlap such that curing of bonding resin 502 begins after infusion has begun, e.g., by applying heat to the mold in which the stacked formation 128 resides and before the entire requisite volume of resin is applied to the stacked formation 128. As those of ordinary skill in the art will appreciate, other techniques of curing the resin-filled stacked formation 128 are possible including, but not limited to, ambient temperature curing, chemical curing, ultraviolet curing, electron beam curing, and curing by a combination of heat and pressure.

Preform Layers of Multiple Strength Elements or Rods

Figure 5A:
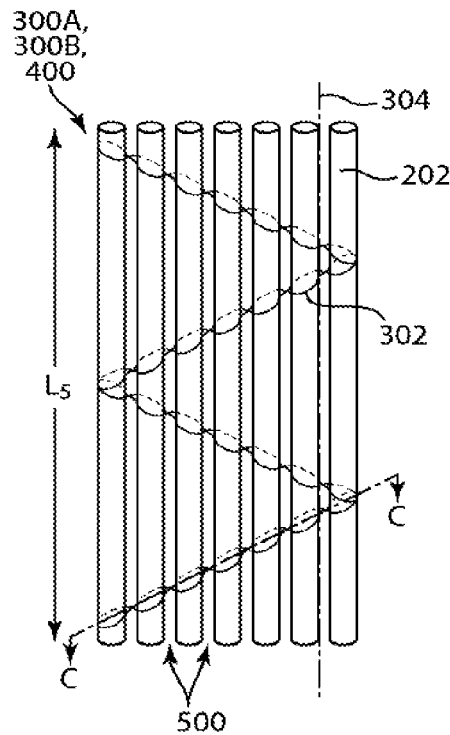
FIG. 5A is a top view of one configuration of a preform layer according to another aspect of the invention.
Figure 5B:
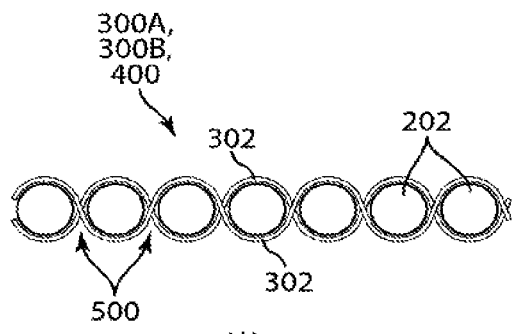
FIG. 5B is a cross-sectional view of a preform layer including a fiber textile weave.
Figure 5C:
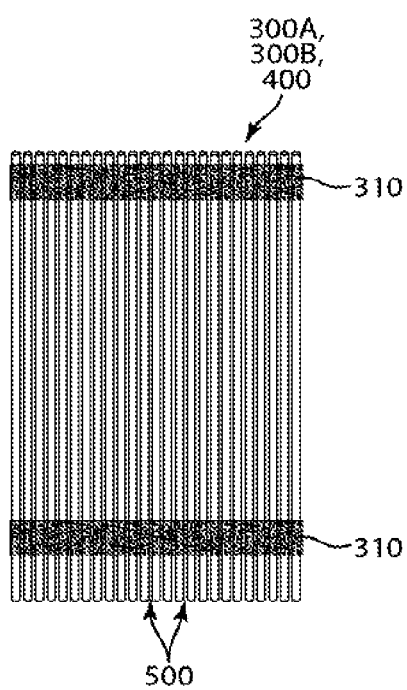
FIGS. 5C and 5D are top views of other configurations of a preform layer.
Figure 5D:
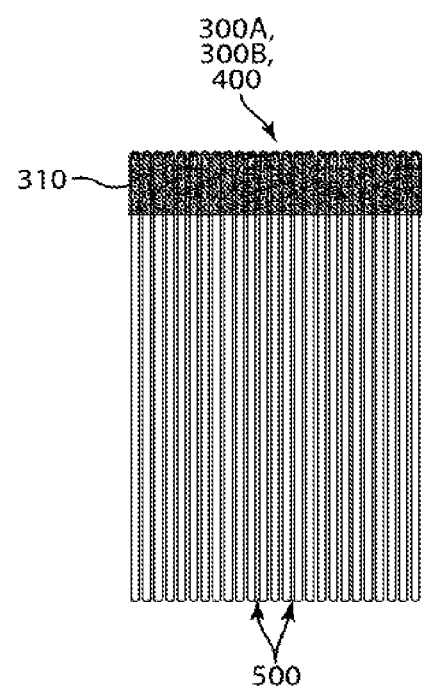
Figure 6:
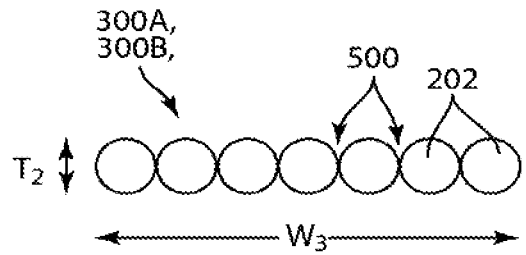
FIG. 6 is a cross-sectional view of the preform layer shown in FIG. 5A taken at lines C-C.
Figure 7:
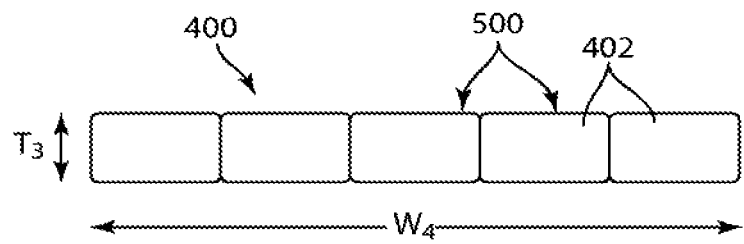
FIG. 7 is a cross-sectional view of the preform layer shown in FIG. 5A taken at lines C-C.

Referring to FIGS. 5A-5D and FIGS. 6-7, in another aspect, the invention provides the preform layer 300A and 300B, as described above, and the preform layer 400 as described with reference to FIG. 7. FIG. 5A is a top view of one embodiment of the preform layer 300A and 300B according to the invention, and FIG. 6 illustrates a cross-sectional view of the preform layer 300A and 300B shown in FIG. 5A. FIG. 7 illustrates a cross-sectional view of another embodiment of the preform layer 400 shown in FIG. 5A according to the invention. The preform layer 300A, 300B and 400 is constructed and arranged with a plurality of elongate unidirectional strength elements or rods 202 and 402 disposed in a single layer and extending substantially along a longitudinal axis 304 of the preform layer 300A, 300B and 400.

The strength elements or rods 202 and 402 exhibit a desirable or requisite stiffness and strength. Yet, the strength elements or rods 202 and 402 also demonstrate a high degree of flexibility such that individual strength elements or rods 202 and 402 and the preform layers 300A, 300B and 400 may adjust and conform to bends and curvatures of such structural blade components as spar caps with minimal or no wrinkling and buckling. The elements or rods 202 and 402 may also exhibit such bending properties during the fabrication of structural components, such as spar caps. Where incorporated in a blade 20, such as twist-coupled blade 20, the spar cap 126 may help to permit the blade 20 to bend and to twist along its span in response to wind and fatigue loads acting along the blade 20.

The preform layer 300A, 300B and 400 may be provided as a prefabricated composite including a defined number of strength elements or rods 202 and 402. The strength elements or rods 202 and 402 are disposed in the preform layer 300A, 300B and 400 in a single layer. The strength elements or rods 202 and 402 are unidirectional with individual elements or rods 202 and 402 aligned longitudinally relative to the length $L_5$ of other elements or rods 202 and 402 in the layer. As illustrated in FIG. 5A and FIGS. 6 and 7, individual elements or rods 202 and 402 are arranged in a single layer adjacent to other elements or rods 202 and 402 along their longitudinal dimension or length $L_5$. In one configuration of the preform layer 300A, 300B and 400 according to the invention, the strength elements or rods 202 and 402 are substantially parallel to one another in the preform layer.

As shown in FIG. 5A, the preform layer 300A, 300B and 400 may optionally include a fiber textile structure 302 that traverses the width $W_3$, $W_4$ of the layer 300A, 300B and 400 at an orientation and in a pattern suitable to retain individual elements or rods 202 and 402 in a single layer. The fiber textile structure 302 is described in detail below with reference to FIG. 5B. Other structures according to the invention that serve to retain the elements or rods 202 and 402 in a single layer are also described in detail below.

FIG. 6 includes a cross-section of the preform layer 300A and 300B shown in FIG. 5A along its transverse width $W_3$ illustrating the arrangement of the elements or rods 202 in a single layer. The elements or rods 202 shown in FIG. 6 define a circular cross-section. The invention, however, is not so limited and envisions that the strength elements or rods can define other cross-sectional profiles including, but not limited to, elements or rods 402 having a substantially rectangular cross-section as shown in FIG. 7.

As FIGS. 6 and 7 illustrate, the elements or rods 202 and 402 define substantially the same cross-sectional diameters such that the preform layer 300A, 300B and 400 has a substantially uniform thickness $T_2$, $T_3$. Circular elements or rods 202 and 402 may define cross-sectional diameters in a range of from about 0.25 mm to about 20 mm.

Figure 8A:
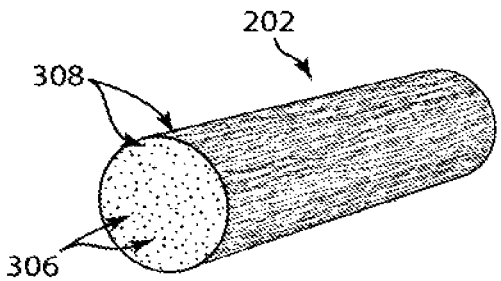
FIGS. 8A and 8B are perspective views of a strength element or rod according to the invention.
Figure 8B:
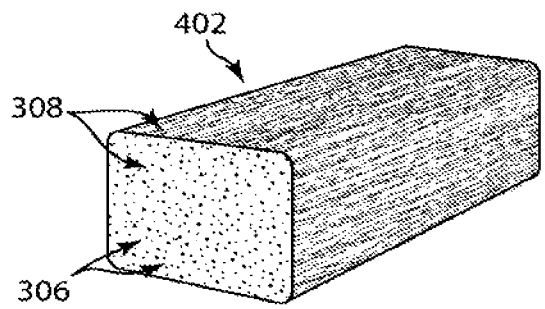

Referring to FIGS. 8A and 8B and with further reference to FIGS. 6 and 7, each strength element or rod 202 and 402 is a cured element or rod or, in some instances, is a preformed element or rod. The elements or rods 202 and 402 are constructed and arranged to serve as structural members and to provide rigidity, compression strength, and flexibility to composite materials and structural components in which the elements or rods 202 and 402 are incorporated, such as the composite beam 127 of the spar cap 126. The high degree of flexibility of the elements or rods 202 and 402 permit the elements or rods 202 to bend and twist to conform to the bends, curvatures, and/or contour of the spar cap 126 that are required for a particular blade design, such as, for instance, a swept blade design.

Each strength element or rod 202 and 402 is constructed of a composite material including elongate and substantially straight structural fibers 306 saturated by a matrix resin 308, e.g., a thermoplastic or cured resin. The fibers 306 are oriented longitudinally and are aligned substantially linearly. The matrix resin 308 is distributed within a mass of the fibers 306 to form, when cured or solidified, a rigid prefabricated element or rod 202 and 402. The resulting elements or rods 202 and 402 have a substantially uniform distribution of fibers 306 within the matrix resin 308. The fibers 306 also have a high degree of collimation whereby the fibers 306 are unidirectional and are substantially linear relative to other fibers 306 in the element or rod 202 and 402. The relative straightness of the fibers 202 and 402 and significant fiber collimation yield strength elements or rods 202 and 402 that exhibit high rigidity and significant compression strength, which are required and highly advantageous where the preform layers 300A, 300B are employed to fabricate load-bearing structures, such as the spar cap 126, and structural elements and reinforcements of blade components. The resulting preform layer 300A, 300B and 400 thereby includes prefabricated elements or rods 202 and 402 that impart the required and desirable stiffness and compressive strength to each of the multiple preform layers 300 forming the composite beam 127 or other blade components.

The type of elongate structural fibers 306 is selected with respect to fiber type, fiber diameter, and/or fiber filamentization depending on the properties required for the spar cap 126 and other blade components. The elongate structural fibers 306 generally define diameters in a range of from about 1 micrometer to about 100 micrometers, and include, but are not limited to, glass fibers, carbon fibers, basalt fibers, and combinations thereof.

The matrix resin 308 surrounding the fibers 306 includes a resin matrix suitable for adhering to and fixing the fibers 306 and for providing rigidity and strength to the resulting element or rod 202 and 402, as well as to the preform layer 300A, 300B and 400. The matrix resin 308 may include non-curable resins or heat/radiation cured resins including, but not limited to, a thermoplastic resin or a thermoset resin. The matrix resin 308 may be selected based on the mechanical reinforcement properties the matrix resin 308 provides to the resulting individual strength elements or rods 202 and 402 and the preform layers 300A, 300B and 400.

The preform layers 300A, 300B and 400 of prefabricated strength elements or rods 202 and 402 do not shrink during cure of the bonding resin 502 that is applied to the stacked formation 128, as described below with reference to FIGS. 11A and 11B. The resulting preform layers 300A, 300B and 400 exhibit resistant to wrinkling, kinking, and buckling during fabrication of the spar cap 126. Unlike prior art fiber fabrics and composites used to construct spar caps, the prefabricated strength elements or rods 202 and 402 (comprising the fibers 306 embedded in the pre-cured matrix resin 308) substantially resist shrinkage during cure of the bonding resin 502. The strength elements or rods 202 and 402 thereby help to eliminate or substantially reduce the incidence of wrinkling, kinking, or buckling of the preform layers 300A, 300B and 400 during fabrication of the spar cap 126. In addition, the pre-cured matrix resin 308 and/or the structural fibers 306 provide individual elements or rods 202 and 402 of the preform layer 300A, 300B and 400 with resistance to fiber wash during applications of the bonding resin 502 to the stacked formation 128.

The resistance to shrinkage and fiber wash that the preform layers 300A, 300B and 400 according to the invention exhibit helps to avoid or at least minimize wrinkling, kinking, and buckling and thereby helps to eliminate or at least minimize any structural weaknesses in the resulting spar cap 126.

The strength elements or rods 202 and 400 may further define surface characteristics and/or surface chemistry that help to promote adhesion of the elements or rods 202 and 402 to the bonding resin 502. Surface characteristics of the elements or rods 202 and 402 include, but are not limited to, a textured surface, a roughened surface, or a chemically treated surface achieved with various techniques, e.g., applying a surface coating, to produce, e.g., roughened, surfaces of the elements or rods 202 and 402. Textured or roughened surfaces promote adhesion of the bonding resin 502 to the elements or rods 202 and 402.

In addition, textured or roughened surfaces of the strength elements or rods 202 and 402 help to facilitate penetration of the bonding resin 502 between strength elements on rods 202 and 402, particularly where the preform layers 300A, 300B and 400 are stacked or layered. Textured or roughened surfaces of elements or rods 202 and 402 also help to increase bonding between individual elements or rods 202 and 402 and between preform layers 300A, 300B and 400 such that the inner laminar sheer strength of stacked or layered preform layers 300A, 300B and 400, and the composite beam of the spar cap 126, is increased. Further, textured or roughened surfaces of elements or rods 202 and 402 help inhibit delamination cracks between the bonding resin 502 and the strength elements or rods 202 and 402 thereby increasing the fatigue life of the preform layer 300A, 300B and 400 and the resulting spar cap 126 or other blade components in which the preform layer 300A, 300B and 400 is included.

As shown in FIG. 5A, the optional fiber textile structure 302 interfaces with the strength elements or rods 202 and 402 to retain the elements or rods 202 and 402 in a single layer with individual elements 202 and 402 oriented adjacent, e.g., and substantially parallel to, one another along their longitudinal dimension or length $L_5$. The preform layer 300A, 300B and 400 shown in FIGS. 6 and 7 may not include the strength elements or rods 202 and 402 bonded to one another. In these configurations, the fiber textile structure 302 consequently produces a relatively loose weave of strength elements or rods 202 and 402 that defines minute spaces 500 between adjacent elements or rods 202 and 402.

The minute spaces 500 between strength elements or rods 202 and 402 enhance the flexibility of the individual elements or rods 202 and 402 and facilitate the ability of the elements or rods to bend, particularly where the elements or rods 202 and 402 are formed in the preform layer 300A, 300B and 400 or are incorporated in the composite beam 127 of the spar cap 126 or other blade components. During formation, e.g., molding, of the composite beam 127, the bending abilities of the elements or rods 202 and 402 are advantageous. Such bending abilities permit the elements or rods 202 and 402 to make minor adjustments to the bends and curvatures of the spar cap 126 design such that the elements or rods 202 and 402 substantially conform to the shape or contour of the spar cap 126. The spar cap 126 and the preform layers 300A, 300B and 400, each according to the invention, permit fabrication of the spar cap 126 with a structure that conforms or corresponds to the shape of the blade 20, while providing the blade 20 with its requisite structural support and load bearing properties.

The preform layers 300A, 300B and 400 according to the invention, therefore, may be used to fabricate the spar cap 126 with a configuration suitable for use as a load-bearing structure in a twist-coupled blade 20. The spar cap 126 may be included in the twist-coupled blade 20 to help to construct the blade 20 with twist bend coupling abilities whereby the blade twists as it bends along its span $L_1$ or horizontal axis. The spar cap 126 construction according to the invention may help to facilitate the ability of the twist-coupled blade 20 to mitigate aerodynamic loads. During operation of the turbine, the blade 20 bends in response to the aerodynamic loads acting on the blade 20 and also twists to alter its aerodynamic performance. Specifically, the blade 20 passively pitches to feather in response to wind loads such that the blade 20 passively and rapidly sheds such loads. Incorporating the spar cap 126 according to the invention into a bending/twist-coupled blade 20 may help the blade 20 to respond rapidly to wind gusts and to rotational speeds, as well as may help to reduce fatigue damage to the blade 20 over a range of wind speed conditions.

In addition, the minute spaces 500 between the individual strength elements or rods 202 help to facilitate penetration of bonding resin 502 into a stacked formation 128 of multiple preform layers 300A, 300B and 400 or a stacked formation 128 of multiple preform layers 300A, 300B and 400 stacked, layered or interleaved with multiple fibrous layers 602. The spaces 500 facilitate flow and penetration of the bonding resin 502 between individual elements or rods 202 and 402 and between preform layers 300A, 300B and 400 and multiple fibrous layers 602. As described below, rates of bonding resin 502 infusion or injection that are achieved in stacked formations 128 including the preform layers 300A, 300B and 400 according to the invention are relatively rapid in comparison to resin infusion or injection rates that are obtained with applications of bonding resin 502 to prior art fibrous and composite materials and laminates used to construct spar caps.

FIG. 5B illustrates one configuration of the preform layer 300A and 300B according to the invention including the fiber textile structure 302. The fiber textile structure 302 includes, but is not limited to, an interlocking textile fiber weave, e.g., a plain or square weave and a fabric made via stitching. The fiber textile structure 302 extends across the transverse width $W_3$ of the preform layer 300A and 300B and interfaces with individual strength elements or rods 202 so that the fiber weave 302 retains the elements or rods 202 in a single preform layer 300A and 300B. As shown in FIG. 5A, the textile weave 302 can define a weave that extends across the width $W_3$ of the preform layer 300A and 300B in a zigzag pattern. As shown in FIG. 5B, the textile weave 302 can further include stitching that interlocks between the strength rods or elements 202. The invention, however, is not specifically limited in this respect and anticipates that any of a variety of textile weave types and patterns may retain the strength elements or rods 202 of a single preform layer 300A and 300B. As a retaining structure, the fiber textile structure 302 also spaces individual strength elements or rods 202. The fiber textile structure 302 thereby helps to form the relatively loose weave of strength elements or rods 202 as described above. The loose weave defines minute spaces 500 between the elements and rods 202 that help to enhance the bend and twist/sweep abilities of the elements and rods 202 and help to facilitate penetration of the bonding resin 502 between individual elements or rods 202 and between stacked or layered preform layers 300A and 300B. Similarly, the fiber textile structure 302 may be incorporated with the preform layer 400 shown in FIG. 7 to interface with individual strength elements or rods 402 so that the fiber weave 302 retains the elements or rods 402 in a single preform layer 400.

Referring to FIGS. 5C and 5D, the preform layer 300A, 300B and 400 according to the invention may include one or more bands or strips of a joining material 310 configured to serve as an alternative retaining structure to the fiber textile structure 302. The bands or strips of material 310 traverse the width $W_3$ or $W_4$ of the preform layer 300A, 300B and 400 at certain locations along the length $L_5$ of the preform layer 300A, 300B and 400 so that the bands or strips 310 help to secure individual elements or rods 202 and 402 in a single layer. The joining material 310 penetrates between and surrounds individual elements or rods 202 and 402 at the points of its application to help to retain the elements or rods 202 and 402. The joining material 310 includes any bonding agent or adhesive suitable for retaining individual elements or rods 202 and 402 and may include, but is not limited to, a hot-melt agent or adhesive, a UV-cured bonding agent or adhesive, an elastomeric adhesive, or a bonding or adhesive tape. In one configuration of the preform layer 300A, 300B and 400 according to the invention, the joining material 310 includes a mass of adhesive threads that are applied along the width $W_3$ or $W_4$ of the preform layer 300A, 300B and 400 at certain locations. In another configuration of the preform layer 300A, 300B and 400 according to the invention, the joining material 310 includes an elastomeric adhesive that is compatible with the bonding resin 502, such as an epoxy resin, that is applied to the stacked formation 128.

Figure 9A:
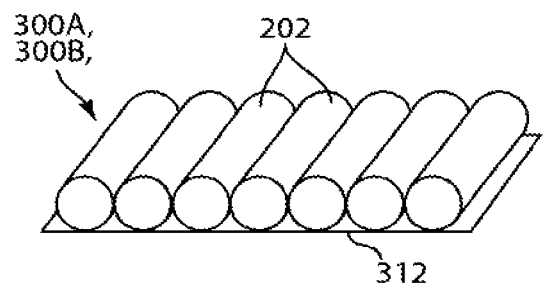
FIGS. 9A-9D are perspective views of a preform layer joined with a fibrous carrier layer according to the invention.
Figure 9B:
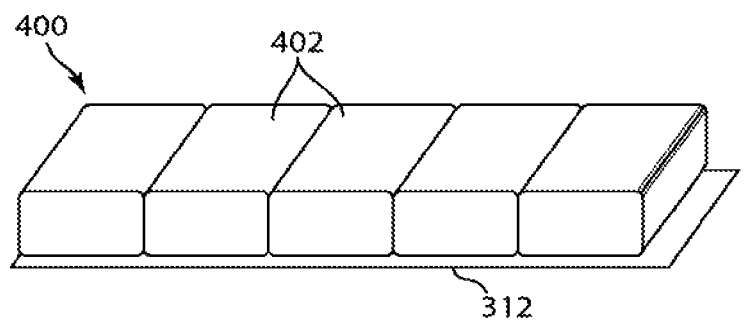

Referring to FIGS. 9A and 9B, the preform layer 300A, 300B and 400 according to the invention may include a carrier layer 312 as an alternative retaining structure to the fiber textile structure 302 and the one or more bands or strips of joining material 310. The carrier layer includes, but is not limited to, a fibrous carrier layer 312 constructed of a nonwoven fabric, which serves as a substrate to which the individual strength elements or rods 202 and 402 are joined or bonded to retain the elements or rods 202 and 402 in a single layer. One or more nonwoven adhesive coating layers may be disposed along a surface of the carrier layer 312 on which the elements or rods 202 and 402 are disposed. Thereafter, the carrier layer 312 and element or rods 202 and 402 may be laminated to form the preform layer 300A, 300B and 400. The carrier layer 312 is constructed of one or more fabric materials suitable to facilitate permeation and thereby penetration of bonding resin 502 between individual strength elements or rods 202 and stacked or adjacent individual preform layers 300A, 300B and 400.

A given number of strength elements or rods 202 and 402 is arranged along the carrier layer 312 in a single layer with individual elements or rods 202 and 402 adjacent, e.g., and substantially parallel to, one another along the length $L_5$ of the elements or rods 202 and 402. As mentioned, the elements or rods 202 and 402 are affixed or bonded to the carrier layer 312 with an adhesive and may define between adjacent elements or rods 202 and 402 minute spaces 500. The fibrous carrier layer 312 may include a nonwoven fabric constructed of fibers, yarns, and/or rovings including, but not limited to, polyester fibers, yarns and/or rovings; polyamide fibers, yarns and/or rovings; polyolefin fibers, yarns and/or rovings; glass fibers, yarns and/or rovings; carbon fibers, yarns and/or rovings; aramid fibers, yarns and/or rovings; graphite fibers, yarns and/or rovings; or basalt fibers, yarns and/or rovings; and combinations thereof. In preferred configurations of the carrier layer 312 according to the invention, the carrier layer comprises glass or polyester fibers, yarns and/or rovings.

The fibers, yarns, and/or rovings of the carrier layer 312 help to increase the fiber volume of the preform layer 300A, 300B and 400 and, in particular, help to strengthen the preform layers 300A, 300B and 400 along the spaces 500 between the elements or rods 202 and 402 in which the applied adhesive may reside. The carrier layer 312 thereby helps to increase the transverse and longitudinal strength of the preform layer 300A, 300B and 400, such that, the resulting spar cap 126, or other blade components in which the preform layer 300A, 300B and 400 is incorporated, helps to mitigate shear forces three-dimensionally.

In one embodiment of the preform layer 300A, 300B and 400 according to the invention, the nonwoven fibrous carrier layer 312 includes a fabric comprising multiple transverse fibers, yarns and/or rovings that are disposed at a substantially transverse orientation, or at about 90°, relative to the strength elements or rods 202 and 402 when the preform layer 300A, 300B and 400 is assembled. In another embodiment of the preform layer 300A, 300B and 400 according to the invention, the nonwoven fibrous carrier layer 312 includes a stitched fabric, e.g., a biaxial or triaxial fabric.

The carrier layer 312 is constructed and arranged to serve as a substrate to which the strength elements or rods 202 and 402 are joined or bonded to retain the elements or rods 202 and 402 in a single layer. The carrier layer 312 may define dimensions, e.g., length and width, similar to the dimensions of the single layer of elements or rods 202 and 402 that form the preform layer 300A, 300B and 400. The layer 312 may include one or more fibers, yarns and/or rovings constructed of one or more materials, such as those identified above, suitable to facilitate permeation and penetration of the bonding resin 502 between individual strength elements and rods 202 and 402, and between individual preform layers 300A, 300B and 400, when the bonding resin 502 is applied to an assembled stacked formation 128. Stitching, bonding, and/or other method(s) to configure the fibrous carrier layer 313 may interconnect the fibers, yarns, and/or rovings. As described below with referenced to FIG. 13, the carrier layer 312 according to the invention may also include a woven fabric including fibers, yarns, and/or rovings woven in a particular weave type or pattern.

One or more adhesive layers may be disposed along at least one surface of the fibrous carrier layer 312; thereafter, one or more strength elements or rods 202 and 402 are disposed along the coated surface of the layer 312 to form the preform layer 300A, 300B and 400.

Configurations of the preform layer 300A, 300B and 400 may include the fibrous carrier layer 312 comprising fibers, yarns and/or rovings having from about 3% to about 15% of the total weight of the unidirectional fibers 306 of the strength elements or rods 202 and 402 of a given preform layer 300A, 300B and 400.

Figure 9C:
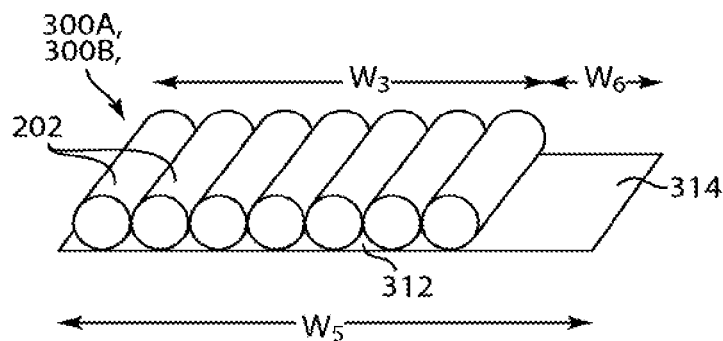
Figure 9D:
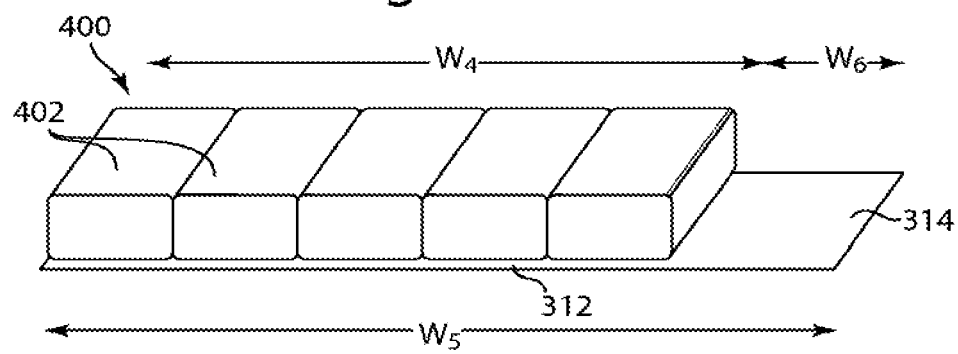

Referring to FIGS. 9C and 9D, in further configurations of the preform layer 300A, 300B and 400 according to the invention, the fibrous carrier layer 312 may define dimensions, e.g., length and width, that are dissimilar from the dimensions of a single layer of elements or rods 202 and 402 that form the preform layer 300A, 300B and 400. In one configuration of the preform layer 300A, 300B and 400, the layer 312 defines a transverse width $W_5$ greater than the transverse width $W_3$ and $W_4$ of a single layer of elements or rods 202 and 402. In this configuration, the layer 312 defines an outer peripheral border or selvedge 314 along at least one edge of the preform layer 300A, 300B and 400 when the elements or rods 202 and 402 and the layer 312 are coupled. The peripheral border or selvedge 314 extends outwardly from the outermost element or rod 202 and 402 along at least one edge of the preform layer.

The peripheral border or selvedge 314 has a width $W_6$ sufficient to help the border or selvedge 314 serve as a point of attachment or an attachment portion sized and configured to join or bond the preform layer 300A, 300B and 400 with one or more components of the spar cap 126 and/or one or more components of the blade airfoil 100 or, more particularly, the shell portions 120 and 122 of the blade 20. For instance, the peripheral border or selvedge 314 of each preform layer 300A, 300B and 400 may be interleaved or overlaid with one or more fibrous layers 602 to help to secure the preform layer 300A, 300B and 400 to one or more other components of the spar cap 126. In another instance, the peripheral border or selvedge 314 may indirectly or directly join, bond or interleave with one or more structural components and/or layers of the shell portion 120 and 122 of the blade 20, such as any of the layers 101, 103, 105 or 107 that form the shell portion 120 or 122. The border or selvedge 314 thereby helps to secure the preform layers 300A, 300B and 400 to the spar cap 126, the blade 20 and/or any components of the spar cap 126 or blade 20.

Figure 9E:
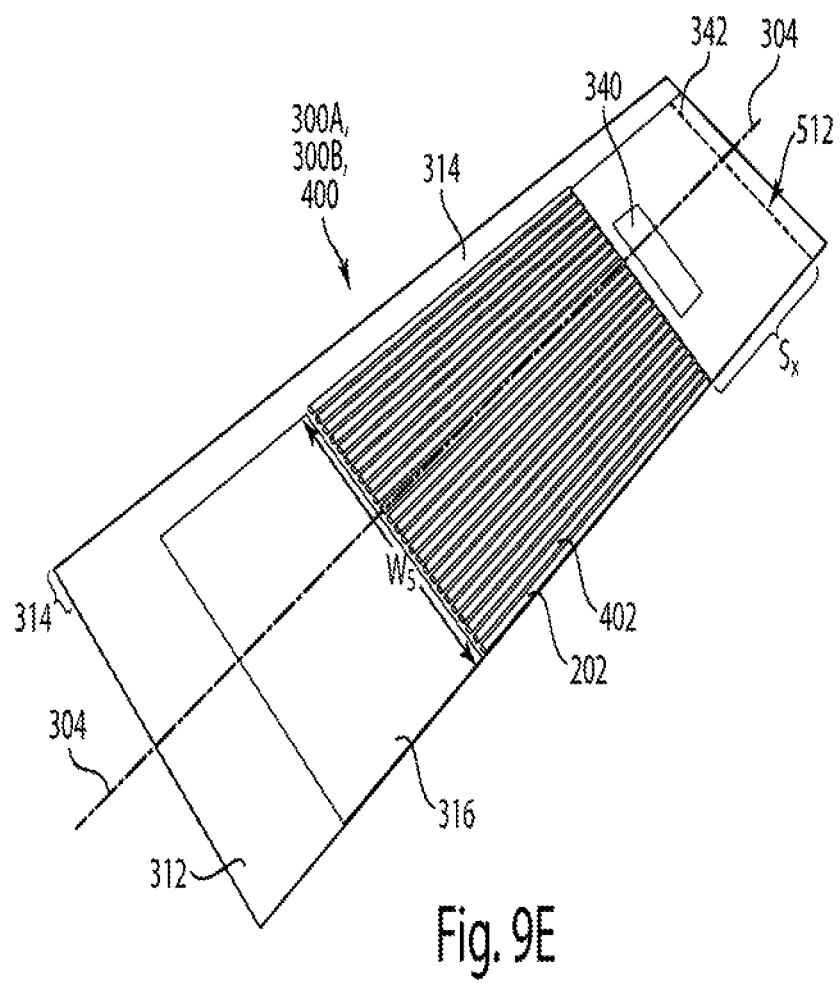
FIG. 9E is a perspective view of a preform layer joined with a fibrous carrier layer and multiple fibrous layers according to the invention.

Referring to FIG. 9E, a schematic perspective view of one configuration of the preform layer 300A, 300B and 400 according to the invention is illustrated and includes multiple elongate unidirectional strength elements or rods 202 and 402 disposed in a single layer and extending substantially along a longitudinal axis 304 of the preform layer 300A, 300B and 400. Multiple strength elements or rods 202 and 402 are disposed adjacent one another along their longitudinal dimension or $L_5$, e.g., and in a substantially parallel orientation, along the fibrous carrier layer 312. Each strength element or rod 202 and 402 is joined or bonded along the carrier layer 312 via one or more layers of adhesive 316 applied to a surface of the carrier layer 312. The one or more adhesive layers 316 in combination with the carrier layer 312 retain the multiple elements or rods 202 and 402 in a single layer.

The preform layer 300A, 300B and 400 illustrated in FIG. 9E includes the peripheral border or selvedge 314 of the carrier layer 312 described above, which extends outwardly along one edge of the preform layer 300A, 300B and 400. While FIG. 9E illustrates the border or selvedge 314 of the carrier layer 312, the invention is not so limited and envisions that the preform layer 300A, 300B and 400 may also include an additional peripheral border or selvedge 314 extending outwardly along an opposite or additional edge of the preform layer 300A, 300B and 400. The invention also anticipates that the carrier layer 312 of the preform layer 300A, 300A may not include any border or selvedge 314.

The preform layer 300A, 300B and 400 may further include a label or printed legend 340 that provides information and/or indicia related to the length of the preform layer and/or related to the station or position of the preform layer 300A, 300B and 400 in the stacked formation 128 and composite beam 127 of the spar cap 126 relative to other preform layers 300A, 300A and 400 and, if present, relative to one or more fibrous layers 602. Such information and/or indicia would help to provide direction in assembling multiple preform layers 300A, 300B and 400, with or without multiple fibrous layers 602, into the stacked formation 128 and composite beam 127. Such information and indicia may further include a preform layer ply or sequential number that identifies the layer's position in the stacked formation 128 and composite beam 127 and/or other manufacturing details or specifications.

Additionally, the preform layer 300A, 300B and 400 may include designations 342 that indicate the station(s) or position(s) at which the preform layer is to be separated, e.g., cut, from another adjacent preform layer 300A, 300B and 400 where one or more preform layers 300A, 300B and 400 are provided in a continuous web 510, as described in detail below with reference to FIGS. 14A-14C. Such designations would also facilitate positioning of the preform layers 300A, 300B and 400 in the stacked formation 128 during assembly of the stacked formation 128.

Multi-Layered Structural Components

Figure 10A:
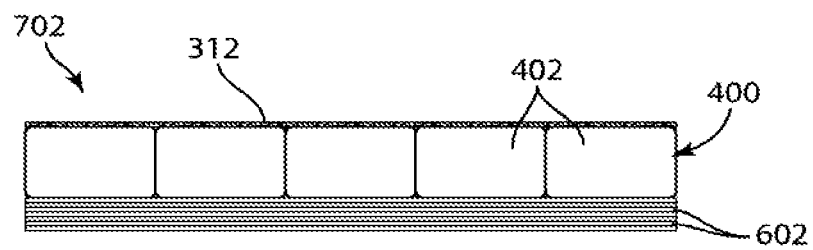
FIGS. 10A and 10B are cross-sectional views of a multi-layered structural component according to another aspect of the invention including at least one preform layer.
Figure 10B:
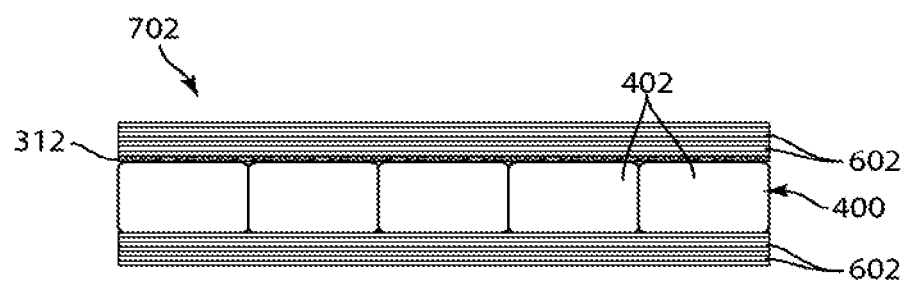

Referring to FIGS. 10A and 10B, in another aspect, the invention provides a multi-layered structural component 702 including at least one of any of the preform layers 300A, 300B and 400 described above that may be joined or bonded to, or interleaved with, one or more fibrous layers 602. The structural component 702 is designed and constructed to serve as a structural element of the composite beam 127 of the spar cap 12, and/or as a structural element or reinforcement of the blade foil 100, such as the shell portions 120 and 122 of the blade 20.

FIGS. 10A and 10B illustrate cross-sections of the multi-layered structural component 702 according to the invention including at least one preform layer 400 joined or bonded to, or interleaved with, multiple fibrous layers 602. While the configurations illustrated in FIGS. 10A and 10B include the preform layer 400 having multiple strength elements or rods 402 with substantially rectangular cross-sections, the invention envisions that the structural component 702 may include one or more preform layers 300A and 300B including elements or rods 202 having circular cross-sections, as described above, or preform layers having strength elements or rods having other cross-section configurations. In addition, while the configurations of the structural component 702 shown in FIGS. 10A and 10B include the carrier layer 312, the invention anticipates that other configurations of the structural component 702 according to the invention may omit the carrier layer 312.

As shown FIG. 10A, one configuration of the structural component 702 includes multiple fibrous layers 602 joined to or interleaved with the preform layer 400 along a surface of the preform layer 400 opposite to the carrier layer 312 to form the multi-layer component 702. Another configuration of the structural component 702 shown in FIG. 10B includes the preform layer 400 joined to or interleaved with multiple fibrous layers 602 along each surface of the preform layer 400, such that, the multi-layered component 702 includes the preform layer 400 sandwiched between multiple fibrous layers 602.

Figure 10C:
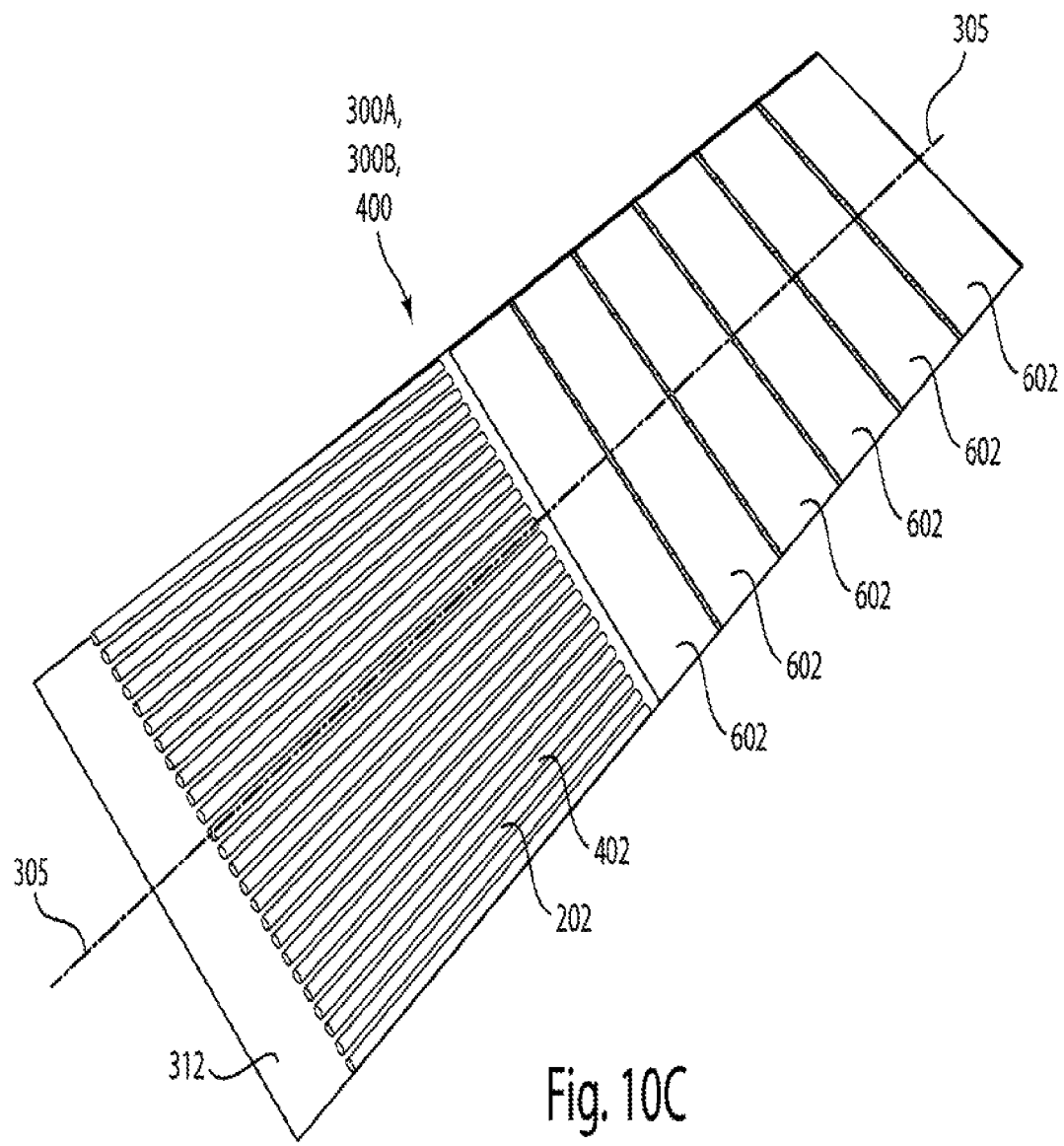
FIG. 10C is a schematic perspective view of the multi-layered structural component of FIG. 10A.

Referring to FIG. 10C, a schematic perspective view of the multi-layered structural component 702 shown in FIG. 10A is illustrated. In this configuration, the structural component 702 includes five fibrous layers 602 joined to or interleaved with a surface of the preform layer 400 opposite to that surface joined or bonded to the fibrous carrier layer 312. Alternatively, the fibrous layers 602 may be joined or bonded to a surface of the carrier layer 312.

One configuration of the structural component 702 shown in FIG. 10C includes the carrier layer 312 constructed of a nonwoven fabric layer having multiple transverse fibers, yarns, and/or rovings. When the carrier layer 312 is joined to multiple unidirectional strength elements or rods 402 arranged in a single layer, the fibers, yarns and/or rovings of the carrier layer 312 are disposed at a substantially transverse orientation, or at about 90°, relative to the unidirectional strength elements or rods 402. In this configuration, the multiple fibrous layers 602 are constructed of biaxial fabric. When assembled with the preform layer 400, each biaxial fibrous layer 602 may have about 10% of its fibers, yarns, and/or rovings disposed at a substantially transverse orientation, or at about 90°, to the strength elements or rods 402, and about 90% of its fibers, yarns, and/or rovings disposed at a substantially longitudinal orientation relative to a longitudinal axis 305 of the preform layer 400. The fiber content or grams per square meter (gsm) of fibers, yarns, and/or rovings of the carrier layer 312 and the fibrous layers 602 can be manipulated to enable fabrication of the structural component 702 with a preferred fiber volume fraction. For example, the structural component 702 shown in FIG. 10C may include five fibrous layers 602 comprising about 800 gsm of fabric fiber, while the carrier layer 312 comprises about 100 gsm of fabric fiber with the resulting multilayer component 702 having a relatively high fiber volume fraction.

In some configurations of the structural component 702 shown in FIGS. 10A-10C, the carrier layer 312 may be constructed of the same material as the fibrous layers 602, such as biaxial fabric. In these cases, the carrier layer 312 as described above may be omitted in order to realize savings in materials costs.

Other configurations of the multi-layered structural component 702 according to the invention are illustrated in FIGS. 10D-10H. Such components 702 may be used as structural elements, e.g., to build the stacked formation 128 and ultimately to construct the composite beam 127 of the spar cap 126, and/or may be used as strength elements or reinforcements, e.g., of the shell portions of the blade 20 or other blade components. Schematic cross sections of various layers/components of the structural component 702 are shown in FIGS. 10D-10H, where E represents at least one of any of the preform layers 300A, 300B and 400 according to the invention including multiple unidirectional strength elements or rods 202 and 402 arranged in a single layer as described above; U represents the carrier layer 312; and F represents multiple fibrous layers 602. The preform layers E according to the invention may help to adapt the multi-layered component 702 for a particular design of the component 702 or for a particular purpose or location of the component 702 in the blade spar cap 126, or in the blade shell portions 120 and 122 or other blade components.

Figure 10D:
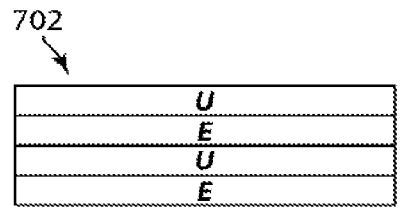
FIGS. 10D-10H are schematic cross-sections of configurations of multi-layered structural components.
Figure 10E:
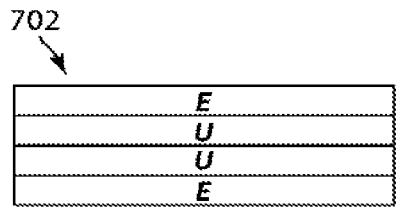

FIG. 10D illustrates a cross section of two stacked or interleaved preform layers E with a carrier layer U joined or interleaved between the two preform layers E to define a multi-layered component 702 with an E, U, E, U configuration. FIG. 10E illustrates a cross section of an alternative arrangement of two stacked or interleaved preform layers E with a carrier layer U of one preform layer E joined or interleaved with a carrier layer U of an adjacent preform layer E to define an E, U, U, E configuration. This configuration is an illustrative example of a multi-layered component 702 having an "exoskeleton" defined by the strength elements or rods 202 and 402 of the preform layer E.

Figure 10F:
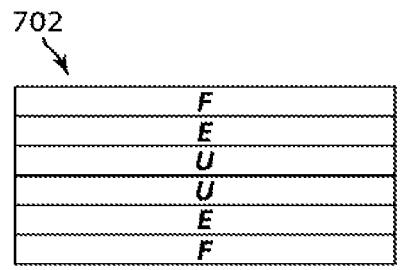

FIG. 10F illustrates a cross section of a variation of the configuration shown in FIG. 10E including multiple fibrous layers F joined or interleaved with the preform layers E along the "exoskeleton" of the structural component 702. The structural component 702 may be subsequently joined to or interleaved with other structural components 702, such as components 702 having the same configuration of layers, whereby the outer fibrous layers F are joined to or interleaved with the outer fibrous layers E of stacked or adjacent structural components 702. The stacked formation 128 may include one or more of the structural components 702 shown in FIG. 10F, such that, the fibrous layers F, which are compressible and less rigid than the strength elements or rods 202 and 402, are located at certain stations, positions or interfaces along the stacked formation 128, e.g., that require compressibility or less rigidity.

Figure 10G:
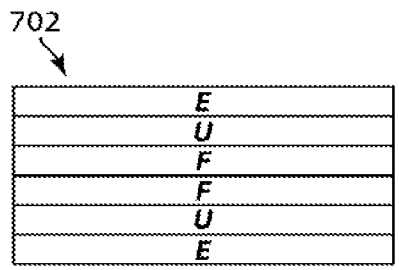

FIG. 10G illustrates a cross section of another variation of the configuration shown in FIG. 10E including multiple fibrous layers F joined to or interleaved with the preform layers E, such that, the fibrous layers F are oriented inwardly and between the two preform layers E. In this configuration, the fibrous layers F are joined to or interleaved with each carrier layer U of stacked or adjacent preform layers E.

The layer arrangements shown in FIGS. 10F and 10G illustrate symmetry of the layers U, E and F within the component 702. Such arrangements may be advantageous in that the symmetry of the layers about a mid-plane of the component 702 may help to resist or minimize fiber shrinkage during fabrication of the component 702 which may produce components 702 that are preferably more flat.

Figure 10H:
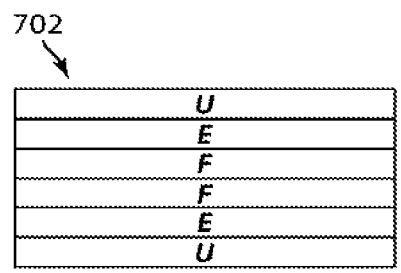

FIG. 10H illustrates a cross section of an alternative arrangement of the fibrous layers F and carrier layers U shown in FIG. 10G whereby the carrier layers U are oriented along an outer surface of the structural component 702.

The invention is not limited to the configurations of the multi-layered structural components 702 shown in FIGS. 10D-10H and envisions that a multi-layered structural component 702 may comprise other stacked or layered arrangements of the preform layers E, carrier layers U and/or multiple fibrous layers F.

Figure 10I:
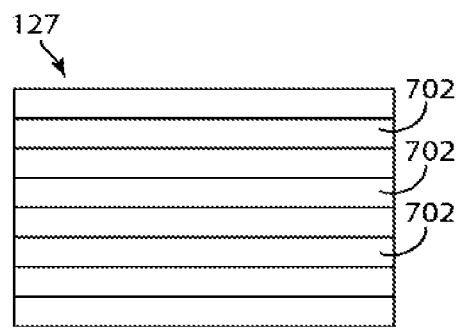
FIG. 10I is a cross-sectional view of a composite beam of a spar cap including multiple structural components.

One or more structural components 702 may be configured and assembled into any of the configurations of the stacked formation 128 and composite beam 127 of the spar cap 126 according to the invention as described above. Referring to FIG. 10I, a cross section taken along the greatest thickness $T_{max}$ of the composite beam 127 shown in FIG. 4F (which results from the stacked formation 128 of one or more preform layers 300A, 300B and 400 and multiple fibrous layers 602) illustrates multiple structural components 702 may be included at certain stations and positions within the stacked formation 128 as is required or desired to provide the spar cap 126 with the requisite compression strength and other mechanical properties.

Additionally, or alternatively, the structural component 702 may be configured and assembled with the stacked formation 128 and composite beam 127 in such a manner to help to reinforce one or more select areas along the stacked formation 128 and composite beam 127. For instance, within the stacked formation 128 and composite beam 127 constructed primarily of multiple fibrous layers 602, one or more components 702 may be used to at least partially reinforce select areas along the stacked formation 128 and composite beam 127, e.g., to provide additional strength and/or to eliminate or minimize wrinkling and buckling of the fibrous layers 602. In such configurations, the one or more preform layers 300A, 300B and 400 of the structural component 702 may define a low percentage, and as little as about 1% or less, of the total weight of a select reinforced area of the stacked formation 128 and composite layer 127.

Preform Layer Stacking Patterns

Figure 11A:
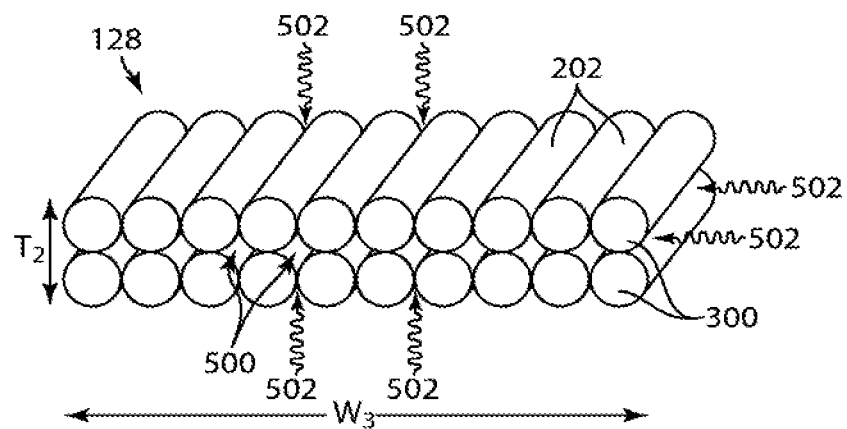
FIGS. 11A-11G are perspective views of stacking patterns of multiple preform layers according to the invention.
Figure 11B:
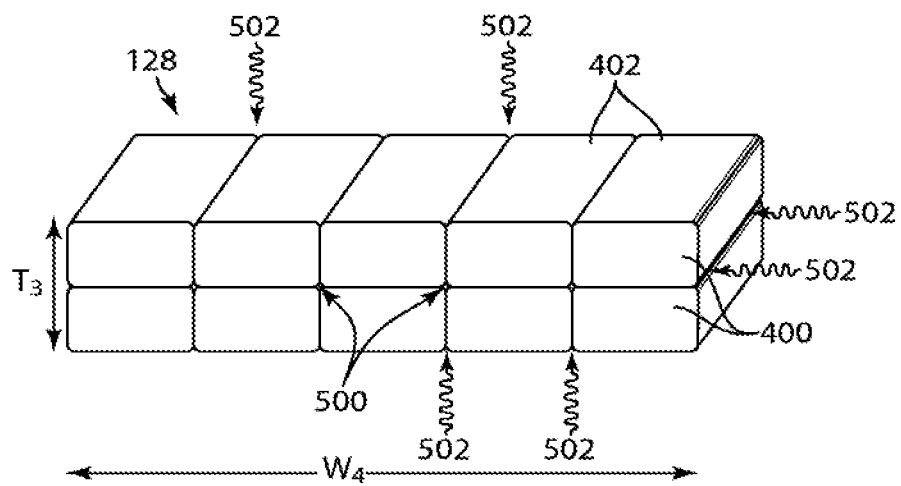

FIGS. 11A and 11B illustrate the preform layers 300A, 300B and 400 in a two-layer stacked formation 128. As shown in FIG. 11A, two preform layers 300A, 300B with elements or rods 202 having circular cross-sections are stacked and the elements or rods 202 of a first layer 301 are in alignment with the elements or rods 202 of a second layer 303 to define a "column pattern." Similarly, as shown in FIG. 11B, two preform layers 400 with elements or rods 402 having substantially rectangular cross-sections are stacked and the elements or rods 402 of a first layer 401 are in alignment with the elements of rods 402 of a second layer 403 to define a column pattern. While two stacked preform layers 300A, 300B and 400 are illustrated in FIGS. 11A and 11B, the invention is not so limited and envisions any number of preform layers 300 and 400 may define the column pattern, as well as the other patterns described below.

Figure 11C:
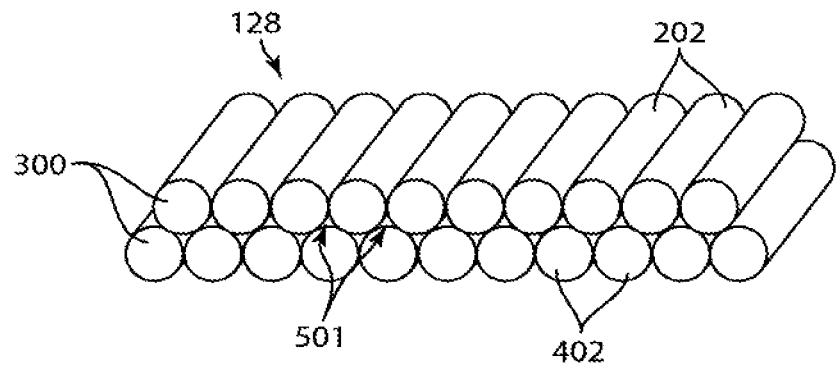
Figure 11D:
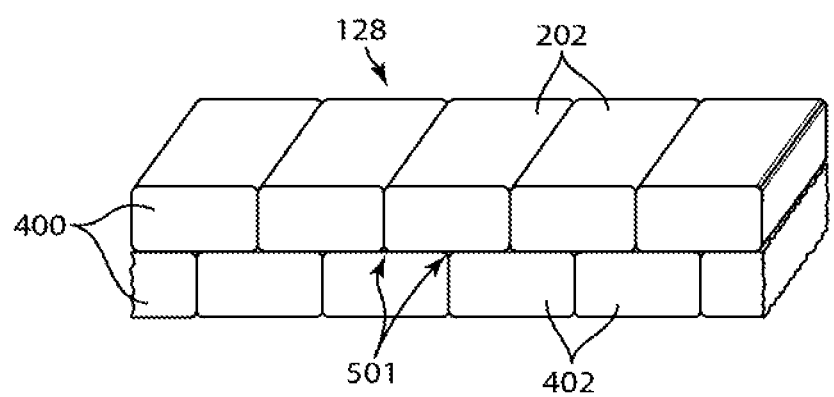

In addition, although individual strength elements or rods 202 and 402 are shown in FIGS. 11A and 11B adjacent one another or in vertical alignment to define the stacked preform layers 300A, 300B and 400 in a column pattern, the invention is not limited in this respect. Referring to FIGS. 11C and 11D, the individual elements or rods 202 and 402 may be disposed in alternating alignment when the preform layers 300A, 300B and 400 are stacked. Such alternating alignment may include at least a portion of an element or rod 202 and 402 of a first layer 300A, 300B and 400 disposed adjacent or in vertical alignment with at least a portion of a space 500 defined between adjacent elements or rods 202 and 402 of a second preform layer 300A, 300B and 400. Such alternating stacking or alignment of the elements or rods 202 and 402 with spaces 500 define the stacked preform layers 300A, 300B and 400 in a "brick pattern."

Figure 11E:
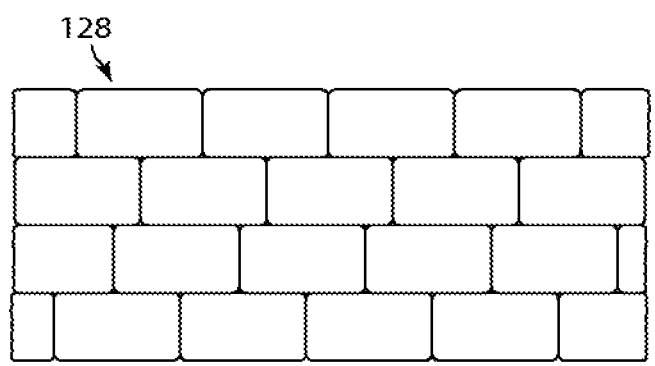

Referring to FIG. 11E, the pattern of the strength elements or rods 202 and 402 may be random within a stacked or layered formation of multiple preform layers 300A, 300B and 400 whereby strength elements or rods 202 and 302 of stacked preform layers 300A, 300B and 400 are not necessarily arranged in a column or brick pattern. Rather, multiple preform layers 300A, 300B and 400 are stacked, such that, the strength elements or rods 202 and 402 of one preform layer relative to another preform layer may define a random pattern, which may or may not include the column or brick patterns.

The stacking or layering patterns of individual preform layers 300A, 300B and 400 described above may advantageously affect the geometry and the size of spaces or voids 500 defined between individual strength elements or rods 202 and 402 of a given preform layer and defined between elements or rods 202 and 402 of adjacent or stacked preform layers 300A, 300B and 400. In addition, the overall dimensions and geometry of individual strength elements or rods 202 and 402 define the geometry and the size of spaces or voids 500. In preferred configurations of the preform layer 300A, 300B and 400 according to the invention individual strength elements or rods 202 and 402 can have a nominally rectangular profile, as shown in FIG. 8B, with rounded edges or edges defining a particular radius of curvature. Rounded edges generate spaces or voids 500 which serve as conduits for liquid bonding resin 502 during application of bonding resin 502 to the stacked formation 128. However, edges with a large radius may create a stress maximum at a point where the strength element or rod edges are in contact. In one configuration of the stacked or layered preform layers 300A, 300B and 400, a preferred edge radius may be less than an upper limit of ¼ quarter of a thickness of an element or rod 202 and 402 and greater than ¼ of the spacing between individual preform layers 300A, 300B and 400.

The substantially uniform thickness $T_2$ and $T_3$ and the substantially uniform transverse width $W_3$ and $W_4$ of the preform layers 300A, 300B and 400 form the composite beam 127 of the spar cap 126 as a finished structure having a well-defined overall dimensions and, in particular, a well-defined thickness, with minimal irregularities. The substantially uniform thickness $T_2$ and $T_3$ and transverse width $W_3$ and $W_4$ of the preform layers 300A, 300B and 400 also enable two or more preform layers 300 and 400 to fit well with other preform layers 300A, 300B and 400 and to define the stacked formation 128 with a repeatable close tolerance.

The substantially uniform thickness $T_2$ and $T_3$ and transverse width $W_3$ and $W_4$ of two or more preform layers 300A, 300B and 400 also provides opportunities to increase or maximize the packing density of the elements and rods 300 and 400 and to increase or maximize the fiber volume fraction of the stacked formation 128, such that, the composite beam 127 may be constructed with a reduced amount of material or a reduced number of preform layers 300A, 300B or 400. In particular, the structure of the strength elements or rods 202 and 402, which includes the substantially straight structural fibers 306 embedded in the matrix resin 308, helps to increase the fiber volume fraction of the members or rods 202 and 402, and to increase the net total fiber volume fraction of the preform layers 300A, 300B and 400. For instance, where the fiber volume fraction of the strength member or rod 202 and 402 is in a range of from about 50% to about 85%, and the total rod volume of the preform layer 300A, 300B and 400 is from about 80% to less than 100%, the net total fiber volume fraction of the preform layer may be increased up to about 85%. As a result, less material or fewer preform layers 300A, 300B and 400 may be used to construct the composite beam 127 of the spar cap without compromising the fiber volume fraction. In addition, using less material or fewer preform layers 300A, 300B and 400 to form the composite beam 127 may produce a lighter and thinner spar cap 126. As a result of the minute spacing 500 between strength elements or rods 202 and 402, the individual elements or rods 202 and 402 provide greater bending and twist strength and produce stronger and thinner preform layers 300A, 300B and 400 without changing the spar cap 126 or blade 20 design.

Figure 11F:
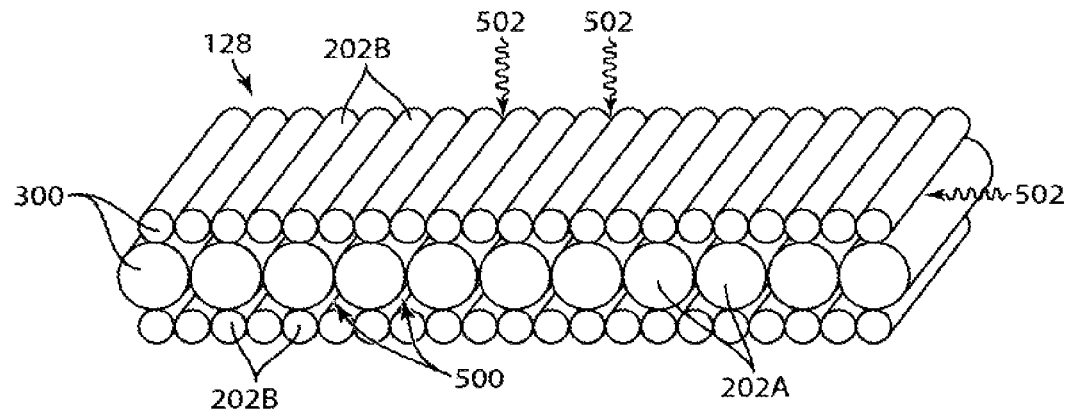
Figure 11G:
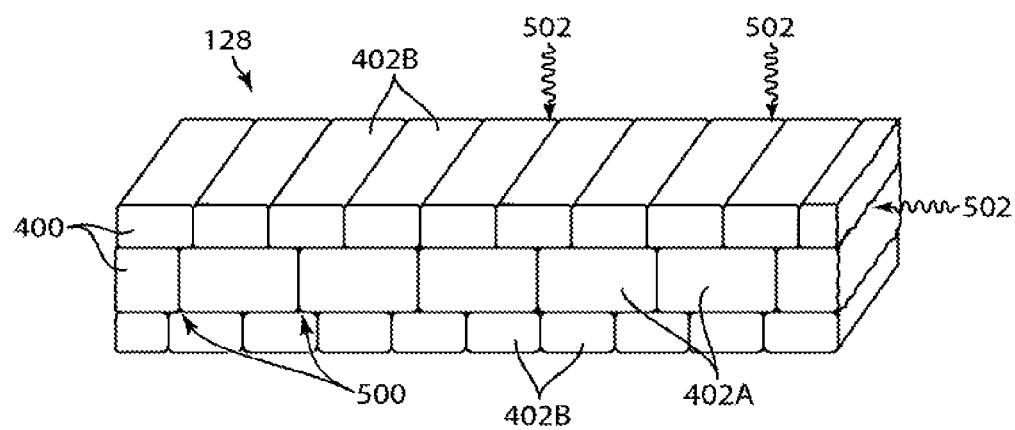

Referring to FIGS. 11F and 11G, the multiple preform layers 300A, 300B and 400 that form the composite beam 127 of the spar cap 126 may not necessarily include individual strength elements or rods 202A, 202B and 402A, 402B defining the same diameter or overall dimensions. Rather, the multiple of preform layers 300A, 300B and 400 within a single composite beam 127 may include one or more layers 300A, 300B and 400 having strength elements or rods 202A, 202B and 402A, 402B of different diameters or overall dimensions. As shown in FIG. 11F, the substantially circular strength elements or rods 202A and 202B of the preform layers 300A, 300B include one or more layers 300A, 300B of elements or rods 202A defining one diameter and one or more layers 300A, 300B of elements or rods 202B defining a different, e.g., larger or smaller, diameter. Similarly, as shown in FIG. 11G, the rectangular elements or rods 402A and 402B of the preform layers 400 include one or more layers 400 of elements or rods 402A defining one set of overall dimensions and one or more layers 400 of elements or rods 402B defining a different, larger or smaller, set of overall dimensions. Such preform layers 300A, 300B and 400 may include elements or rods defining certain diameters, profiles or overall dimensions that facilitate attachment of the spar cap 126 to adjacent elements of the blade 20, such as the web shear 125 and the shell portions 120 and 122. For instance, larger or smaller dimensions of the strength elements or rods 202 and 402 may be advantageous to join one or more preform layers 300A, or to join one or more preform layers 300A, 300B and 400 of the spar cap 126 to an interface between the spar cap and adjacent elements of the blade 20.

Figure 12A:
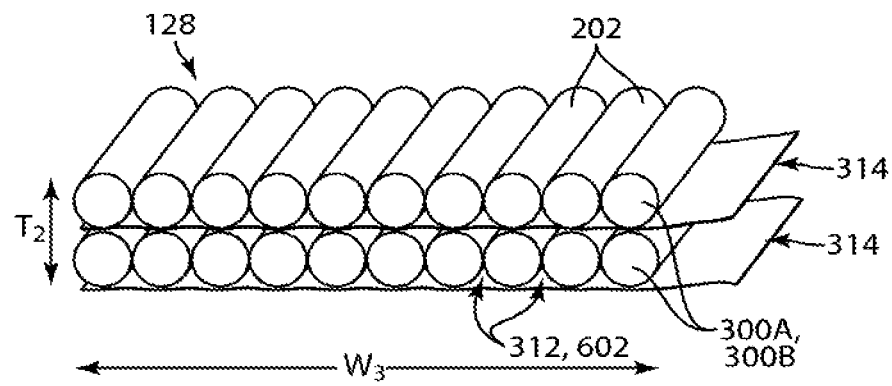
FIGS. 12A and 12B are perspective views of multiple preform layers including a peripheral border or selvedge according to the invention.
Figure 12B:
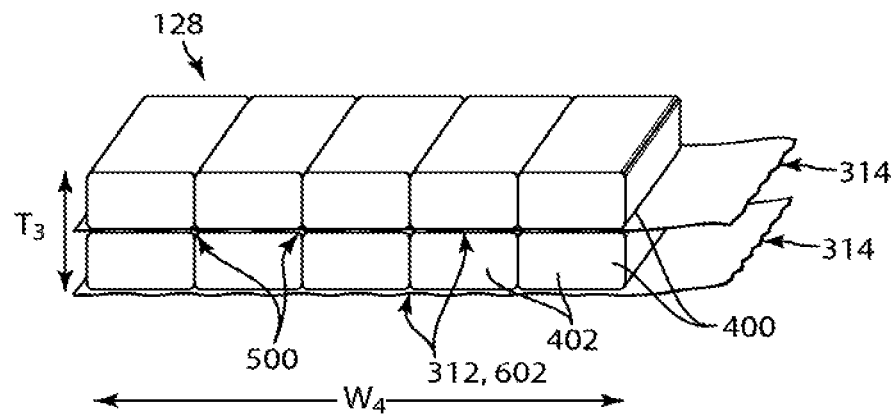
Figure 12C:
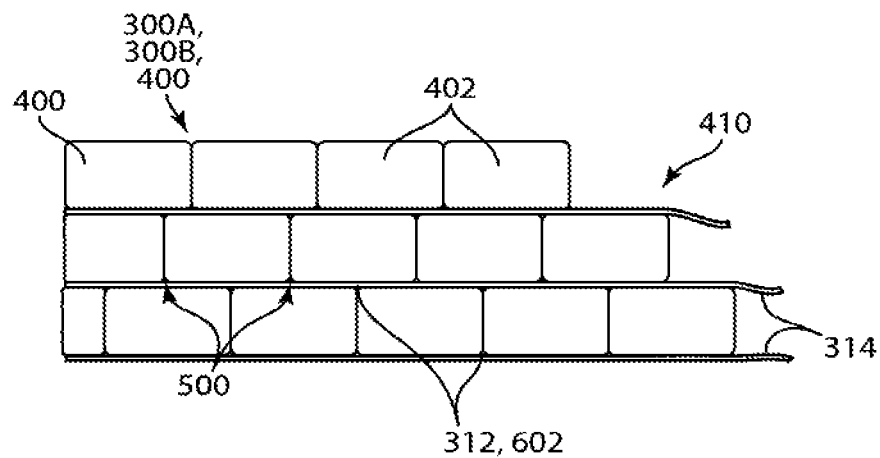
FIG. 12C is a cross-sectional view of multiple preform layers defining a stepped edge.

Referring to FIGS. 12A-12C and with further reference to FIGS. 9A-9E, the preform layers 300A, 300B and 400 of the stacked formation 128 or the composite beam 127 may include individual preform layers 300A, 300B and 400 joined or bonded to, or interleaved with, the fibrous carrier layer 312 and/or multiple fibrous layers 602, as described above. FIGS. 12A and 12B illustrate stacked preform layers 300A, 300B and 400 with each preform layer 300A, 300B and 400 joined or bonded to the carrier layer 312 and/or joined or bonded to, or interleaved with, multiple fibrous layers 602. Each carrier layer 312, and/or one or more of the multiple fibrous layers 602, may include the peripheral border or selvedge 314 as described above. The border or selvedge 314 extends outwardly along at least one edge of each preform layer 300A, 300B and 400 and defines a given width $W_6$. While FIGS. 12A and 12B illustrate only a portion of each preform layer 300A, 300B and 400 and the border or selvedge 314 along one edge of each layer 300A, 300B and 400, the invention is not so limited and envisions that the carrier layer 312, and/or one or more of the fibrous layers 602 may include an additional peripheral border or selvedge 312 along an opposite or other edge of the preform layer 300A, 300B and 400. As mentioned above, the border or selvedge 314 has a width $W_6$ sufficient to help the border or selvedge 314 serve as a point of attachment or an attachment portion sized and configured to help join, bond or interleave the preform layer 300A, 300B and 400 with one or more components of the spar cap 126, and/or with one or more other components or layers of a portion of the rotor blade 20, such as the shell portions 120 and 122. The border or selvedge 314 thereby helps to secure individual or stacked preform layers 300A, 300B and 400, as well as the stacked formation 128 and the composite beam 127 of the spar cap 126, with the rotor blade 20.

Referring to FIG. 12C, in another configuration, two or more of the preform layers 300A, 300B and 400 may be stacked, layered or interleaved with one another to define a stepped side elevation 410 along one or more edges of a preform layer stack. The stepped side elevation 410 is defined by offsetting the positions of each preform layer 400 relative to another preform layer 400 positioned adjacent or directly above and/or below each preform layer 400. As shown in FIG. 12C, the preform layers 400 are stacked in a brick pattern whereby each strength element or rod 402 of one preform layer 400 is substantially aligned with at least a portion of a space or void 500 defined between two adjacent strength elements or rods 202 and 402 of another preform layer 400. However, the preform layers 400 need not be stacked in a brick pattern and their positions relative to adjacent preform layers 400, when stacked, define the stepped side elevation 410. The stepped side elevation 410 facilitates attachment of the preform layer 400 stack to other components of the spar cap 126, and/or to other components of the blade 20, by serving as areas at which the stacked preform layers 400 may be joined or bonded to, or interleaved with, such components. Optionally, the preform layers 400 may be joined or bonded to the carrier layer 312 and/or one or more fibrous layers 602 having the peripheral border or selvedge 314, which would serve as a point of joining, bonding or interleaving the stacked preform layers 400 to components of the spar cap 126 or the blade 20.

Figure 12D:
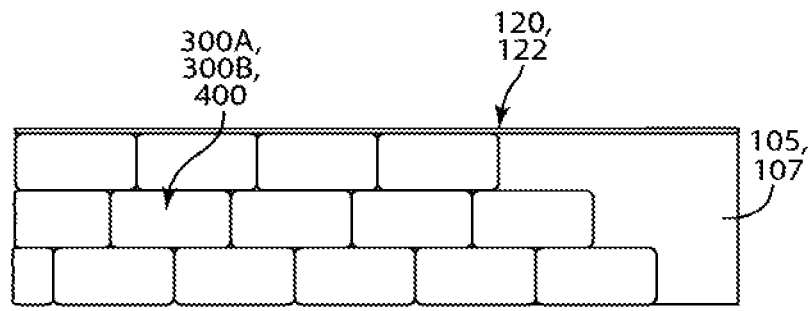
FIGS. 12D and 12E are cross-sectional views of preform layers defining a stepped edge joined to a shell portion of a blade airfoil.
Figure 12E:
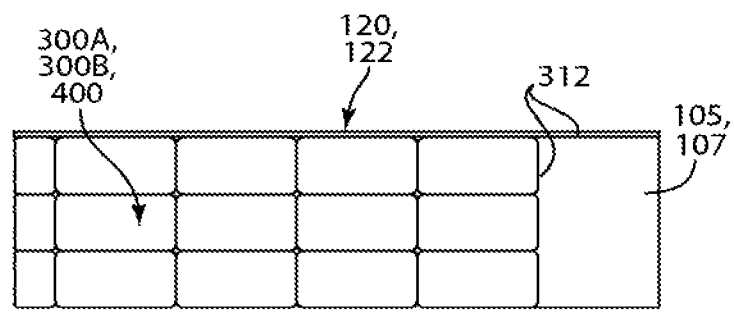

Referring to FIGS. 12D and 12E, stacked preform layers 400 having the stepped side elevation 410 are shown joined or bonded to, or interleaved with, parts of the shell portions 120 and 122 of the blade 20. As shown in FIG. 12D, the stepped side elevation 410, with or without the peripheral border or selvedge 314, provides sites and positions at which the stacked preform layers 400 join or bond to, or interleave with, one or more layers constructing the bladed shell portions 120 and 122. For instance, as shown in FIG. 12D, the stepped side elevation 410 joins or bonds to, or interleaves with, portions of the intermediate, e.g., foam, layer 105 and 107 of the shell portion 120 and 122. In addition, as shown in FIG. 12E, the stacked preform layers 400 may have a substantially uniform longitudinal edge without the stepped side elevation 410. In this case, the peripheral border or selvedge 314, formed from the carrier layer 312 and/or one or more fibrous layers 602 of the preform layers 400, may serve as sites and positions at which the stacked preform layers 400 join or bond to, or interleave with, one or more layers of the shell portions 120 and 122, such as, the intermediate, e.g., foam, layer 105 and 107, as shown.

Figure 13:
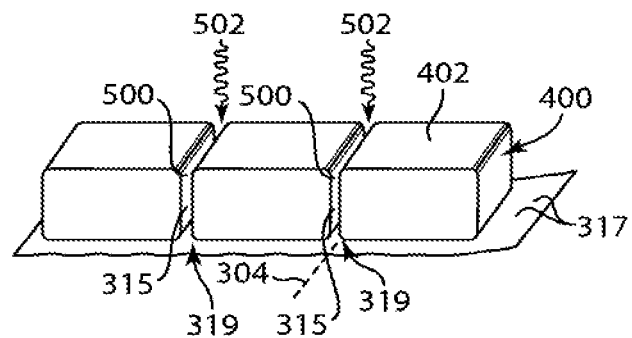
FIG. 13 is a cross-sectional perspective view of a preform layer disposed along a woven fibrous carrier layer according to the invention.

Referring to FIG. 13, in one configuration of the fibrous carrier layer 312 according to the invention, the carrier layer includes a woven fabric carrier layer 313 including multiple warp yarns or rovings 315 and one or more weft or fill yarns 317 interwoven in a pattern. Warp yarns or rovings 315 have a sufficient denier weight, e.g., greater than the one or more weft yarns 317, such that, where bonding resin 502 is applied to the stacked formation 128, bonding resin 502 permeates into the spaces or voids 500 defined between adjacent strength elements or rods 402. The warp yarns or rovings 315 of the fabric layer 313 in combination with the bonding resin 502 may thereby form a joint 319 between adjacent strength elements or rods 402 of a given preform layer 400. The joint 319 helps to minimize the spaces or voids 500 and helps to provide resilience in response to stress loads and stretching along the spar cap 126. The joint 319 thereby helps to minimize cracking of bonding resin 502 and breakage of individual elements or rods 402.

In another configuration of the woven fabric carrier layer 313, the warp yarns or rovings 315 may be configured and/or have sufficient denier, such that, the warp yarns or rovings 315 are raised along one surface of the carrier layer 313. Such raised warp yarns or rovings 315 extend longitudinally along the surface of the carrier layer 313 relative to the longitudinal axis 304 of the unidirectional strength elements or rods 402 and help to serve as alignment features. The raised warp yarns or rovings 315 would assist placement of each strength element and rod 202 and 402 at a given position along the surface of the carrier layer 313.

In a further configuration of the woven fabric carrier layer 313, multiple longitudinal warp yarns or rovings 315 may be configured and/or have sufficient denier, such that, the warp yarns or rovings 313 are raised along both surfaces of the carrier layer 313. The raised warp yarns or rovings 315 would serve as alignment features to assist longitudinal placement of each strength element or rod 202 and 402 along a first surface of the carrier layer 313, as well as would serve as alignment features to assist placement of one preform layer 300A, 300B and 400 with another adjacent preform layer 300A, 300B and 400. The raised warp yarns or rovings 315 along a second surface of the woven carrier layer 313 opposite the first surface of the carrier layer 313 would facilitate stacking or layering the two preform layers 300A, 300B and 400. The carrier layers 313 may be further configured to facilitate stacking or layering preform layers 300A, 300B and 400 in a column, brick or random pattern.

The resulting preform layer 300A, 300B and 400 structure according to the invention, as mentioned, also helps to increase packing density and thereby helps to decrease the volume of bonding resin 502 required to form the composite beam 127 of the spar cap 126 from the stacked formation 128 of multiple preform layers 300A, 300B and 400.

Thus, the construction of the preform layers 300A, 300B and 400 and the stacking or layering patterns and arrangements of the preform layers according to the invention permit control of the dimensions of each preform layer 300A, 300B and 400 and thereby control of the overall dimensions and finished structure of the composite beam 127 that forms the spar cap 126. In addition, use of the strength elements or rods 202 and 402 helps to increase or maximize the net total fiber volume fraction, which helps to boost or maximize the fiber volume fraction of the spar cap 126, while reducing or minimizing the amount of material used to construct the composite beam 127. As noted, a reduction of the volume of bonding resin 502 applied to the stacked formation 128 to form the composite beam 127 is also possible. As a result, reductions in materials and manufacturing costs may be realized using the preform layer 300A, 300B and 400 according to the invention as structural components of the blade spar cap 126.

As described above, the minute spaces 500 between individual strength elements or rods 202 and 402 and between layered or adjacent preform layers 300A, 300B and 400, when formed into the stacked formation 128, help to facilitate penetration of bonding resin 502 during formation of the composite beam 127. Relatively rapid resin 502 penetration rates, e.g., on the order of several minutes, between individual elements or rods 202 and 402 and between individual preform layers 300A, 300B and 400, are possible. As shown in FIGS. 11A and 11B, the bonding resin 502 penetrates and flows into the spaces 500 and any voids.

Further, as mentioned, the mechanical properties of the preformed strength elements or rods 202 and 402 help to enable the elements or rods 202 and 402 to resist wrinkling and shrinkage during application and curing of the bonding resin 502. This eliminates the requirements for slow cure times and relatively low cure temperatures that are currently used in many prior art spar cap fabrication techniques to avoid wrinkling of fibrous and fiber fabrics, composites and materials. In addition, the structure and the mechanical properties of the strength elements or rods 202 and 402 and the resulting preform layer 300A, 300B and 400 according to the invention help individual elements or rods 202 and 402 resist fiber wash during injection or infusion of bonding resin 502. In particular, the strength elements or rods 202 and 402 resist fiber wash along the transverse width $W_2$ of the stacked formation 128 of multiple preform layers 300A, 300B and 400 to which bonding resin 502 is applied. Resistance to fiber wash helps the preform layer 300A, 300B and 400 minimize or eliminate opportunities for the formation of undesirable wrinkles, kinks, or buckling along the composite beam 127 during its fabrication and ultimately along the spar cap 126. The increased rates of bonding resin penetration and the increased resistance of the strength elements or rods 202 and 402 to fiber wash effectively shorten the times required for resin penetration and curing during manufacture of the spar cap 126.

Continuous Web of Preform Layers

Figure 14A:
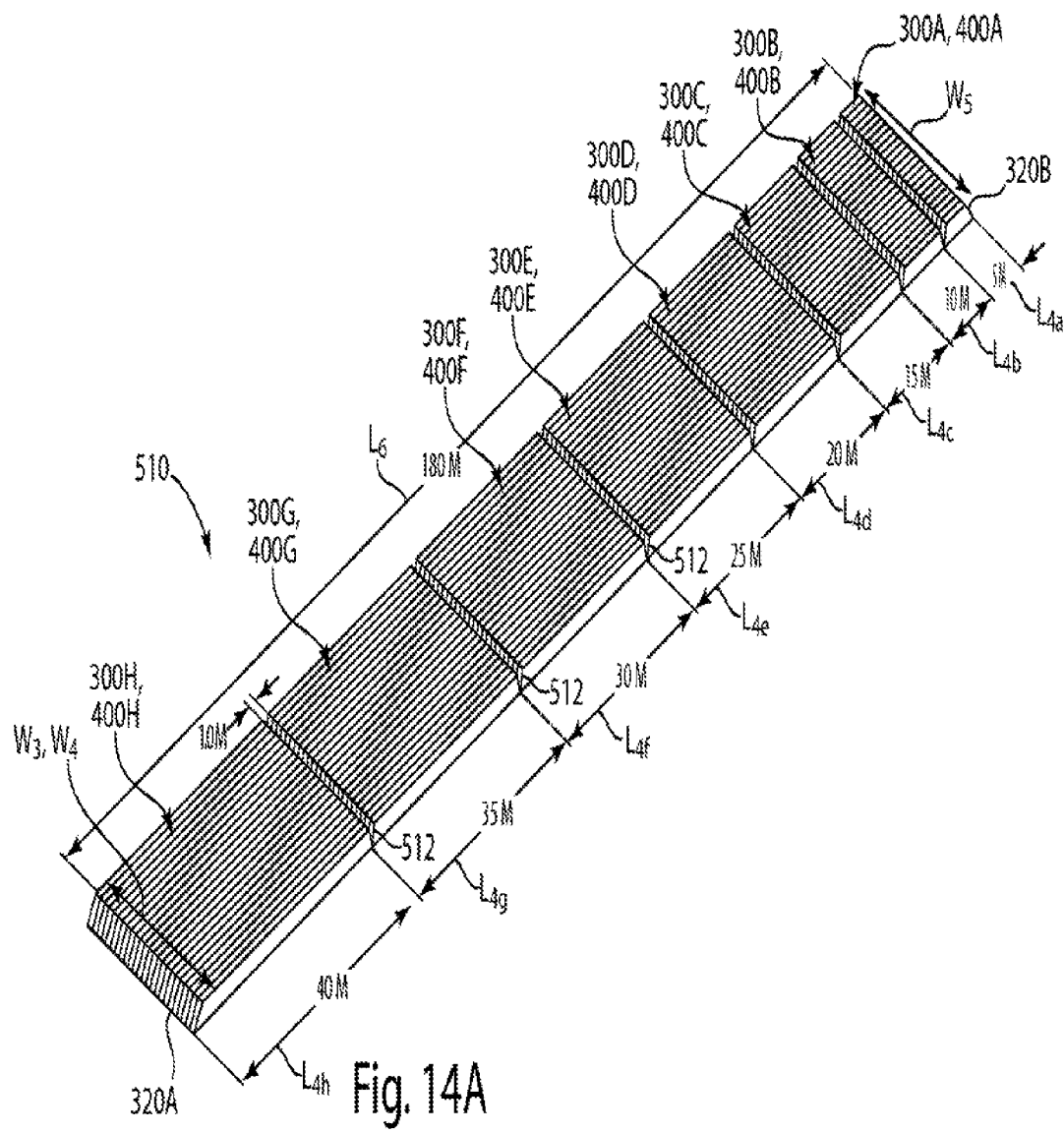
FIG. 14A is a perspective view of another aspect of the invention including a continuous web of multiple preform layers.
Figure 14B:
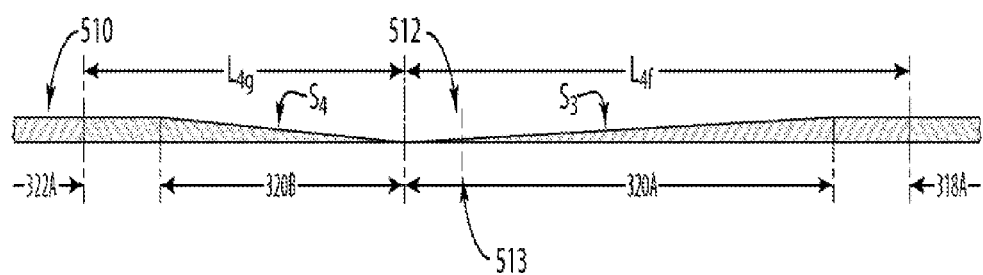
FIG. 14B is a side elevational view of a tapered zone defined in the web shown in FIG. 12A.
Figure 14C:
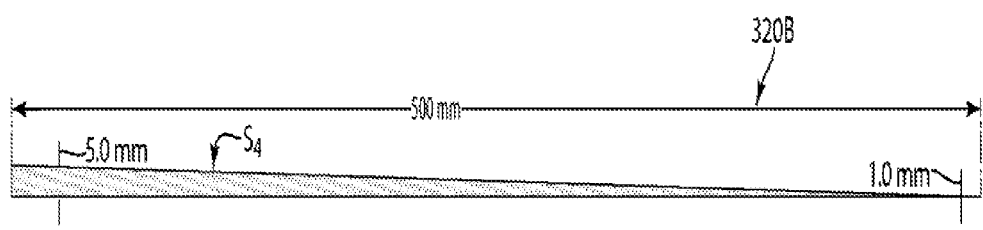
FIG. 14C is a side view of a portion of the tapered zone shown in FIG. 12B.

Referring to FIGS. 14A-14C, in another aspect, the invention provides the plurality of preform layers 300A, 300B and 400 according to the invention configured and arranged in a continuous web 510. The web 510 includes multiple preform layers 300A, 300B and 400 in any of the configurations described above. FIG. 14A provides one illustrative example of the web 510 according to the invention including eight (8) preform layers 300A-H and 400A-H with each preform layer adjacent to at least one other preform layer along its transverse width $W_3$ and $W_4$. The transverse width $W_3$ and $W_4$ of the preform layers 300A-H and 400A-H such as shown in FIGS. 6 and 7 defines the web 510 with a substantially uniform transverse width $W_5$. In addition, the adjacent preform layers 300A, 300B and 400 define the length $L_6$ of the web 510. While FIG. 14A illustrates the web 510 including eight (8) preform layers 300A-H and 400 A-H, the web 510 according to the invention is not limited in this respect and envisions that the web 510 may include any number of preform layers 300A, 300B and 400. The web 510 may be constructed and arranged to supply a number of the preform layers 300A, 300B and 400 sufficient to construct partially or wholly one or more spar cap composite beams 127 or other blade components.

The web 510 defines the plurality of individual preform layers 300A-H and 400A-H as multiple sub-lengths of the web length $L_5$. In this configuration of the web 510, the sub-lengths correspond to the required varying lengths $L_{4a}$, $L_{4b}$, $L_{4c}$, $L_{4d}$, etc. of the preform layers 300A-H and 400A-H shown in FIG. 4E that are used to configure the stacked formation 128 and ultimately the composite beam 127 of the spar cap 126 with a varying thickness, such as shown in FIGS. 4D and 4F. The invention is not limited in this regard and anticipates other configurations of the web 510. For instance, some configurations of the web 510 may include multiple preform layers 300A, 300A and 400 having substantially uniform lengths and transverse widths to supply preform layers 300A, 300B and 400 to construct the composite beam 127 of the spar cap 126 with a substantially uniform transverse width and thickness. Other configurations of the web 510 may include multiple preform layers 300A, 300B and 400 having varying transverse widths to construct the composite beam 127 with a tapering transverse width along its span.

The web 510 further defines tapered end zones 512 across its width $W_5$. The tapered end zones 512 define the web 510 into individual sub-lengths having the varying lengths $L_{4a}$, $L_{4b}$, $L_{4c}$, $L_{4d}$, etc. of the preform layers 300A-H and 400A-H.

As shown in FIG. 14B, each tapered end zone 512 includes thinned portions 320A, 320B and 322A, 318B adjacent at least one end of each preform layer 300A-H and 400A-H. In one configuration of the web 510 according to the invention, the tapered end zones 512 may be formed in the web 510 by removing portions of or thinning the ends of the preform layers 300A-H and 400A-H. In this case, the preform layers 300A-H and 400A-H may initially form the web 510 as a continuous web stock without tapered end zones 512. Thinning or grinding processes or techniques may be used to remove or thin the ends of the preform layers 300A-H, 400A-H to thereby create the tapered end zones 512 in the web 510. Each tapered end zone 512 may include one or more indicia 513 to indicate the point at which adjacent preform layers 300A-H and 400A-H may be separated, e.g., by cutting along the point, from one another. The tapered end zones 512 would be created at predetermined locations along the web 510 to define each preform layer 300A-H and 400A-H with a required or desired length $L_{4a}$, $L_{4b}$, $L_{4c}$, $L_{4d}$, etc.

Still referring to FIG. 14B, the thinned portions 320A, 320B of adjacent preform layers 300A-H and 400A-H define each tapered end zone 512 with certain rates of taper $S_3$ and $S_4$. The rates of taper $S_3$ and $S_4$ may relate to the length of $L_5$ of the web 510, or may relate to the length $L_{4a}$, $L_{4b}$, $L_{4c}$, $L_{4d}$, etc. of any particular preform layer. The tapered end zones 512 may define a point that is sufficiently thin to permit separation, e.g., via cutting or grinding, of the preform layers 300A-H and 400A-H from one another and the web 510. When separated from the web 510, each individual preform layer 300A-H, 400A-H may be included at a specific station or position within the stacked formation 128.

Each preform layer 300A-H and 400A-H has a thinned portion 320A, 320B and 322A, 318B along at least one of its ends. The rates of taper $S_3$ and $S_4$ of the thinned portions 320A, 320B and 322A, 318B may correspond to and may help to configure the taper of the thickness of the spar cap 126, particularly where the spar cap 126 is constructed primarily of preform layers. The rates of taper $S_3$ and $S_4$ may also correspond to the relative smoothness or continuous tapering of the spar cap 126. Such continuous taper may reduce or minimize the stress riser effect of an otherwise blunt cut or ground separation between preform layers. Typically, the minimum thickness of the thinned portions would be thin enough to reduce the stress riser effect to acceptable levels, and thick enough to maintain the longitudinal tensile strength of the web 510. For instance, such minimum thickness can be between about 5% to about 50% of the nominal untapered thickness. In a preferred embodiment, the minimum thickness can be about 20% of the untapered thickness.

FIG. 14C illustrates a side view of a thinned portion 320B of one end of a first preform layer 300A-H, 400A-H that forms part of a tapered zone 512. The thinned portion 320B defines a rate of taper $S_4$ that may correspond to a rate of taper $S_x$ of a thinned portion of a second preform layer. Where the first and the second preform layers are stacked or layered during fabrication of the stacked formation 128, the thinned portions may be positioned within the stacked formation 128 relative to one another to help to define a taper of the thickness of the stacked formation 128. In this manner, the thinned portions 320A, 320B and 322A, 318B with certain rates of taper $S_x$ may continuously adjust the tapering thickness of the stacked formation 128

The varying lengths of the preform layers 300A-C and 400A-C, and the rates of taper $S_x$ of the thinned portions of the preform layers, may also determine the station or position of each preform layer 300A-H, 400A-H in the stacked formation 128. This is the case with the configuration of the web 510 shown in FIG. 14A, which would supply each preform layer 300A-C and 400A-C for placement at a particular station or position in the stacked formation 128 shown in FIGS. 4D and 4F. Stacking or layering the preform layers 300A-C and 400A-C in their respective stations or positions would define the tapering thickness of the stacked formation and ultimately the composite beam 127 of the spar cap 126.

The web 510 may be constructed with any number of preform layers 300A-H and 400A-H sufficient to supply preform layers 300A-H and 400A-H to partially or wholly construct one or more composite beams 127. The web 510 may be configured in a coil, or wrapped along a reel or spool, for purposes of storing and shipping the web 510 and for purposes of dispensing preform layers 300A-H, 400A-H during fabrication of the spar cap 126 and/or other components of the blade 20.

Structural and Reinforcement Preform Layers

Figure 15:
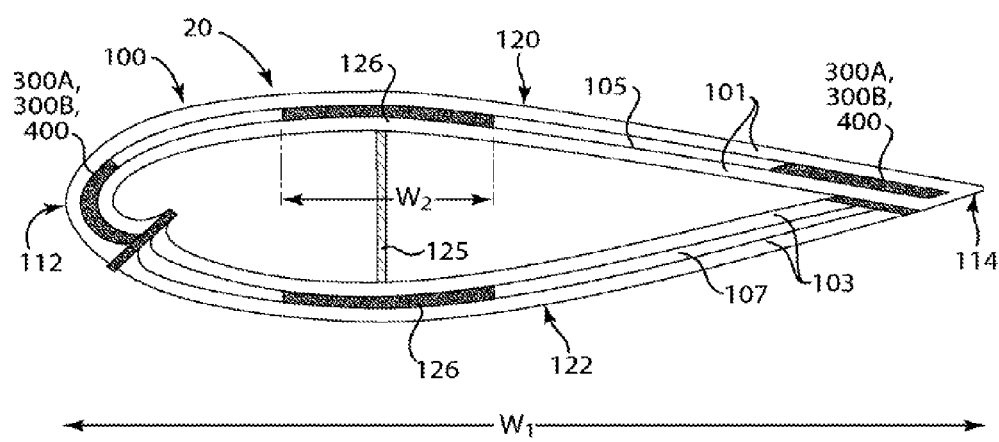
FIG. 15 is a cross-sectional view of the blade shown in FIG. 3 including one or more preform layers disposed in the blade shell portions.

Referring to FIG. 15, in another aspect, the invention provides the preform layer 300A, 300B and 400 in any of the configurations described above to serve as a structural, strength, and/or reinforcement component or member of the blade 20 construction. FIG. 15 is a cross-sectional view of the blade 20 shown in FIG. 2 taken along lines A-A and illustrates the upper and the lower shell portions 120 and 122 of the blade 20. One or more preform layers 300A, 300B and 400 may be designed and constructed for inclusion into the upper and/or the lower shell portions 120 and 122 as a strengthening and/or reinforcement component or member. In some configurations, the preform layer 300A, 300B and 400 may be integral with at least a portion of the leading edge 112 of the blade 20 defined by layers of the upper and lower shell portions 120 and 122. As shown in FIG. 15, one or more preform layers 300A, 300B and 400 may be included in the intermediate, e.g., foam, layer 105 and 107 of the upper and lower shell portions 120 and 122 along a portion of the leading edge 112 of the blade 20. Alternatively, or additionally, one or more preform layers 300A, 300B and 400 may be included in the intermediate, e.g., foam, layer of the upper and lower shell portions 120 and 122 along a portion of the trailing edge 118 of the blade 20. In either application the preform layer 300A, 300B and 400 according to the invention is constructed and arranged to provide strength and/or reinforcement along the portion of the leading edge 112 and/or the trailing edge 118 in which it is incorporated. In addition, the preform layers 300A, 300B and 400 may help to add additional geometric control to the blade 20, such that, the blade 20 manages aerodynamic vortices and sheds air loads, as well as manages impact along the blade 20, due to warping, ice shedding, and birds. The invention is not limited in this respect and envisions that the preform layer 300A, 300B and 400 may be designed and constructed substantially as described above, and/or may be further configured, to serve as a reinforcement and/or strength member of other components of the blade 20.

Having thus described at least one illustrative aspect of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A composite beam for a wind turbine blade comprising:
    a plurality of stacked preform layers, each of the plurality of stacked preform layers including multiple elongate strength rods arranged longitudinally relative to one another in a single layer, each strength rod being disposed adjacent to and spaced from at least one adjacent strength rod;
    each of the plurality of stacked preform layers also including a carrier layer to which the multiple elongate strength rods are joined to form the preform layer;
    wherein the carrier layer spaces adjacent strength rods a fixed distance apart to facilitate the flow of liquid bonding resin between adjacent strength rods of the preform layer to its joined carrier layer, the carrier layer being of a permeable material suitable to facilitate the flow of liquid bonding resin through the carrier layer; and
    further comprising one or more layers of at least one of a fibrous woven material or a fibrous non-woven material stacked with the plurality of stacked preform layers.

2. The composite beam of claim 1, including an absence of material between each strength rod, the absence of material comprising one or more spaces permitting flow of liquid bonding resin between adjacent strength members.

3. The composite beam of claim 1, wherein the carrier layer includes at least one of: a non-woven material and a woven material.

4. The composite beam of claim 3, wherein the at least one of non-woven material and a woven material are selected for their wettability and material compatibility with the elongate strength rods.

5. The composite beam of claim 1, wherein the multiple elongate strength rods are joined to the carrier layer by an adhesive, the adhesive being an adhesive compatible with the liquid bonding resin.

6. The composite beam of claim 1, wherein each elongate strength rod has a rectangular cross-section and each of the rectangular elongate strength rods includes rounded edges.

7. The composite beam of claim 6, wherein the rounded edges of the strength rods define an edge radius of curvature.

8. The composite beam of claim 7, wherein the edge radius is less than an upper limit of $1/4$ of the thickness of the rectangular strength rods.

9. The composite beam of claim 6, wherein the rectangular cross sections of each of the strength rods are substantially the same size.

10. The composite beam of claim 1, wherein the multiple elongate strength rods in the stacked preform layers are stacked in a brick pattern.

11. The composite beam of claim 1, wherein the multiple elongate strength rods in the stacked preform layers are stacked in a column pattern.

12. The composite beam of claim 1, wherein the multiple elongate strength rods in the stacked preform layers are stacked in a random pattern.

13. The composite beam of claim 1, wherein the carrier layer and the one or more layers of fibrous woven or non-woven materials are constructed of the same materials.

14. The composite beam of claim 1, wherein the carrier layer of the preform layer comprises at least one of a non-woven material and a woven material having one or more of substantially unidirectional: multiple fibers, multiple yarns and multiple rovings disposed at a substantially transverse orientation relative to the longitudinal axis of the strength rods.

15. The composite beam of claim 1, wherein the composite beam forms one or more of a spar cap, an I-beam, a shear web and other structural blade components of the wind turbine blade.

16. The composite beam of claim 1, wherein the fibrous material is selected from one or more of: glass fabrics, meshes, fibers, yarns and/or rovings; carbon fabrics, meshes, fibers, yarns and/or rovings; graphite fabrics, meshes, fibers, yarns and/or rovings; basalt fabrics, meshes, fibers, yarns and/or rovings; and ceramic fabrics, meshes, fibers, yarns and/or rovings.

17. The composite beam of claim 1, wherein the one or more preform layers stacked with the one or more layers of fibrous woven materials or non-woven materials are fixed by solidified liquid bonding resin to define the composite beam.

18. The composite beam of claim 1, wherein the one or more layers of fibrous woven or non-woven materials are comprised of permeable materials suitable to facilitate permeation and penetration to permit flow of the liquid bonding resin through the one or more layers of fibrous woven or non-woven materials.

19. The composite beam of claim 2, wherein the spaces between the elongate strength rods, the permeability of materials of the carrier layer and of the one or more fibrous woven or non-woven materials permit the liquid bonding resin to flow through the spaces through the carrier layer and through the fibrous woven or non-woven materials.

* * * * *